United States Patent [19]

Akiyama et al.

[11] Patent Number: 4,837,637

[45] Date of Patent: Jun. 6, 1989

[54] SCANNING METHOD FOR DISK PLAYER

[75] Inventors: Toru Akiyama; Shigeru Yasuda; Kenichiro Yasukawa; Yasumasa Fukatsu, all of Tokorozawa, Japan

[73] Assignee: Pioneer Electronic Corporation, Tokyo, Japan

[21] Appl. No.: 86,801

[22] Filed: Aug. 19, 1987

[30] Foreign Application Priority Data

Aug. 19, 1986 [JP] Japan .............................. 61-194449
Aug. 28, 1986 [JP] Japan .............................. 61-202307
Aug. 29, 1986 [JP] Japan .............................. 61-203245

[51] Int. Cl.$^4$ ............................................. H04N 5/76
[52] U.S. Cl. ..................................... 358/342; 369/32
[58] Field of Search .............. 358/312, 336, 342, 907; 360/10.1; 369/44, 32

[56] References Cited

U.S. PATENT DOCUMENTS 4,439,791 3/1984 Hirata ................................. 358/342

Primary Examiner—James B. Mullins
Attorney, Agent, or Firm—Fleit, Jacobson, Cohn & Price

[57] ABSTRACT

A scanning method for high-speed reproduction of video data from a recording disk, whereby scanning is executed as a sequence of track jump operations, in which the data detection point of the pickup is caused to jump across tracks of the disk, alternating with intervals of play operation in which data are read from the disk. During each interval of play operation, data obtained from the disk are written into a memory, and thereafter are repetitively read out from the memory to produce an output video signal, until being updated during the next play interval. A display image that is free from noise and disorder is thereby obtained during scanning operation.

6 Claims, 20 Drawing Sheets

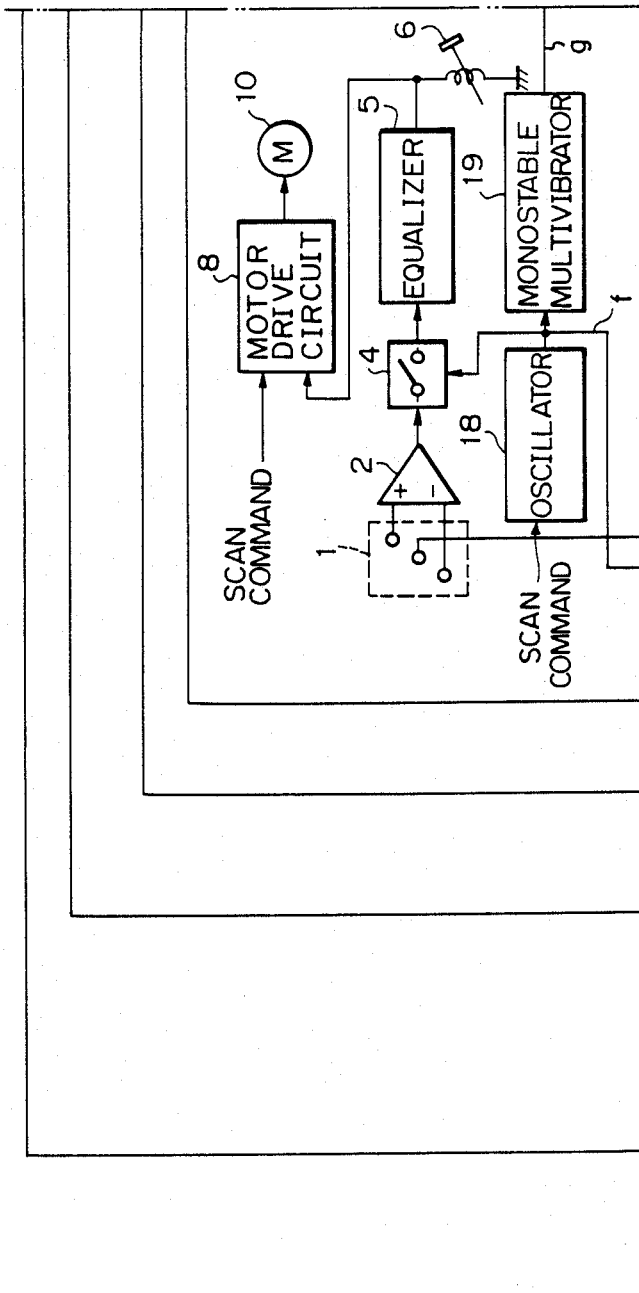

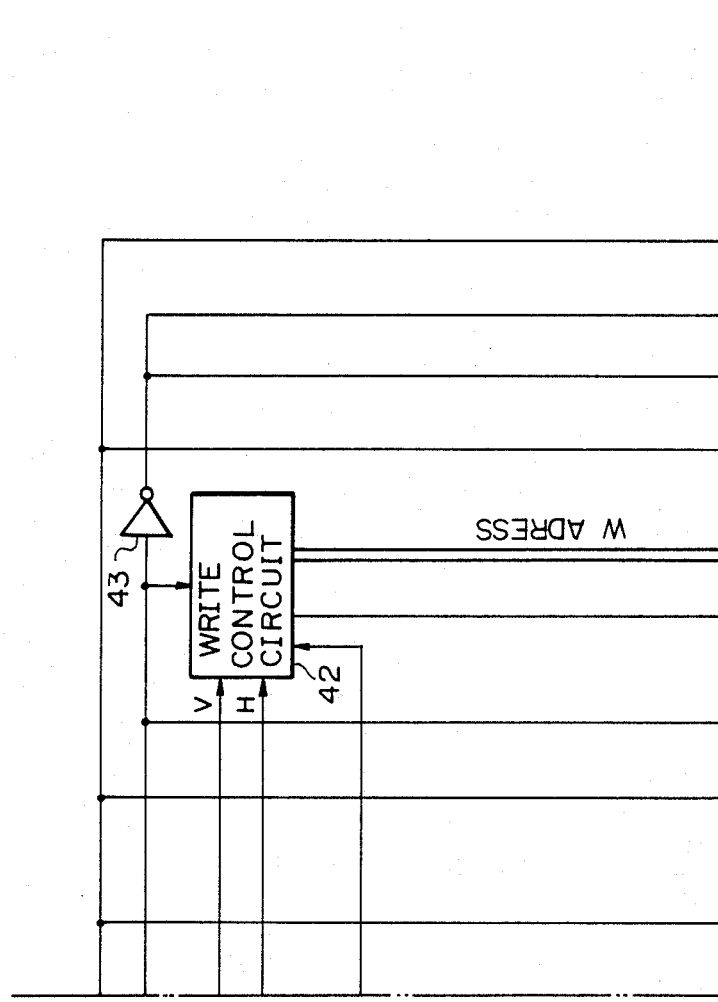

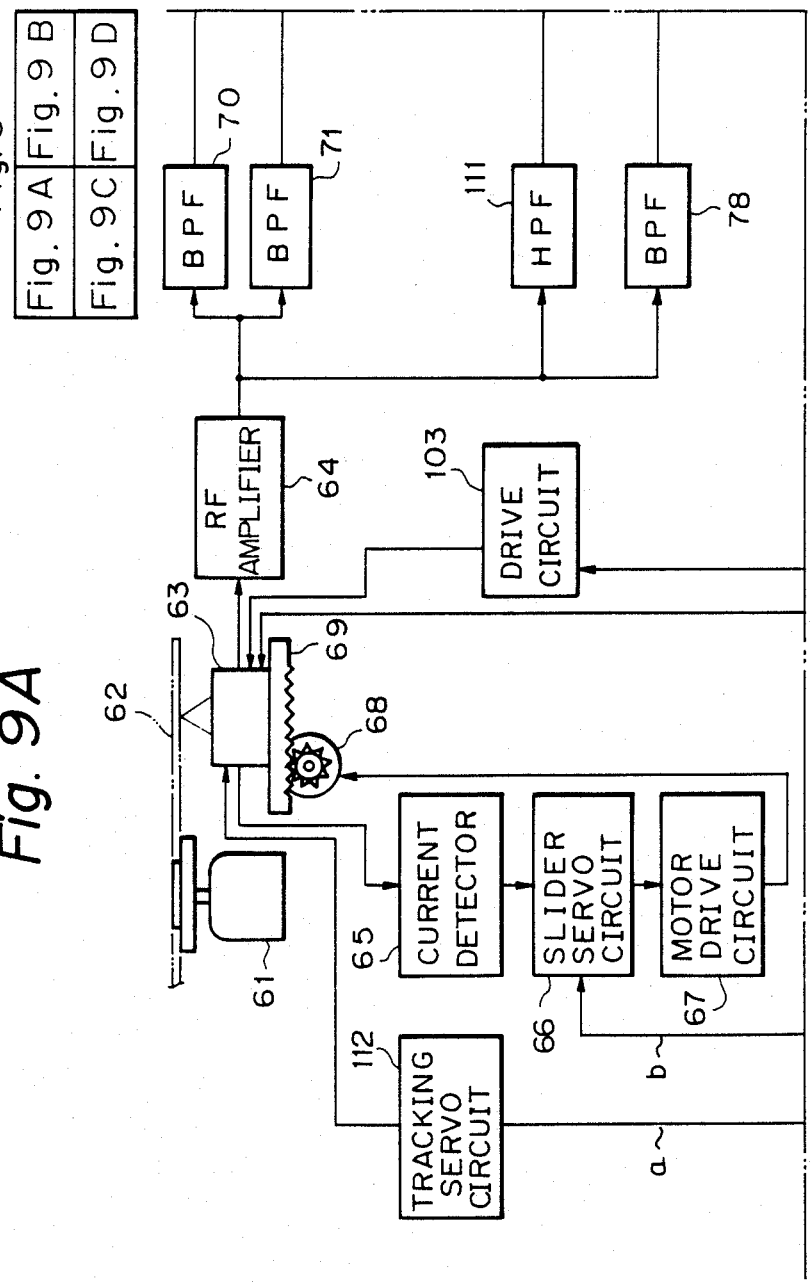

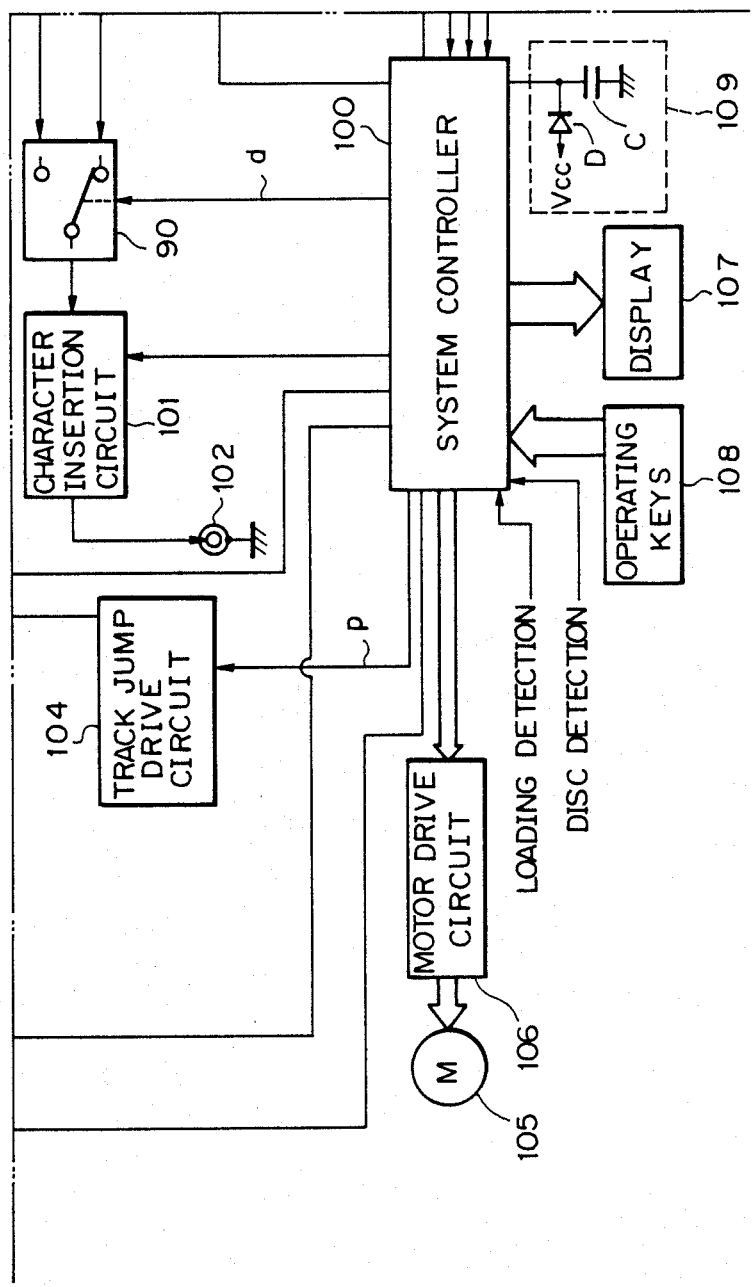

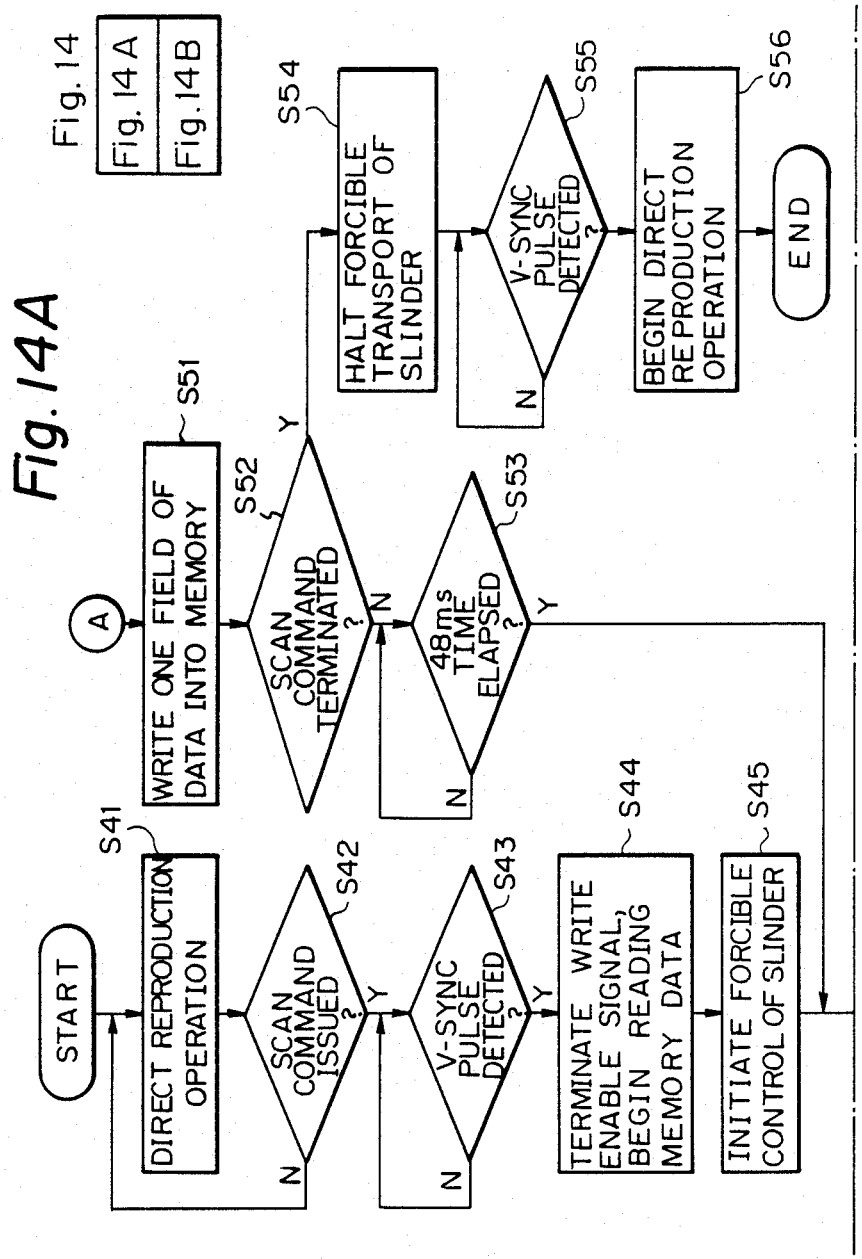

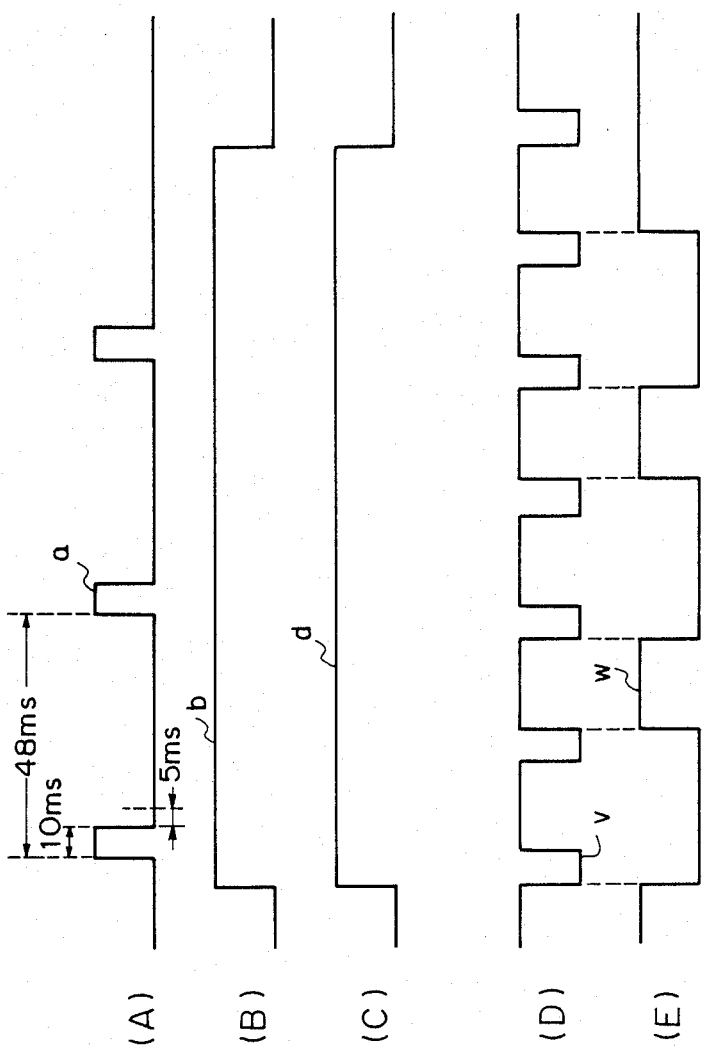

SCANNING METHOD FOR DISK PLAYER

BACKGROUND OF THE INVENTION

1. Field of the Invention

The present invention relates to a scanning method for a disk player, and in particular to a scanning method whereby data recorded on a recording disk such as a video disk can be played back at high speed.

2. Description of Background Information

FIG. 1 is a general block diagram of an apparatus which has been proposed in the prior art for implementing scanning by a disk player, i.e. a high-speed playback operation function whereby so long as a predetermined command is being issued, high-speed playback is executed by successive repetitions of operations consisting of playing back a portion of the data recorded on a disk, jumping over one or more recording tracks of the disk, again performing data playback, and so on. In FIG. 1, reference numeral 1 denotes a photodetector which is contained within a pickup and utilized to detect tracking deviations of the pickup by the 3-beam method. Elements 1a and 1c of the photodetector 1 receive light which is reflected from a spot of light formed on the recording disk by an auxiliary light beam which is used for tracking error detection purposes. Output signals from the elements 1a and 1c are supplied to a subtractor circuit 2, whereby a tracking error signal b is produced. In addition, an element 1b of the photodetector 1 receives light which is reflected from a light beam spot (the data detection point) which is formed on the recording disk by a main beam and which is used for detection of data recorded on the disk. The resultant output signal from element 1b is supplied to an FM demodulator 3 whereby a video signal e is reproduced.

The output signal from the subtractor circuit 2 is transferred through a loop switch 4 to an equalizer 5 which performs phase correction of the tracking error signal. The output signal a from the equalizer 5 is applied as a drive signal to a tracking actuator 6 to thereby complete a tracking servo loop. In addition, the output signal a from the equalizer 5 is supplied to a window comparator 7 and to a motor drive circuit 8. The window comparator 7 is configured such as to produce an output signal which is at a high level when the absolute value of the output signal level from the equalizer 5 is higher than a predetermined value. The output signal c from the window comparator 7 is supplied as a trigger signal to a monostable multivibrator 9. The $\overline{Q}$ output d from the monostable multivibrator 9 is used as a control signal which executes ON/OFF control of the loop switch 4. Specifically, when the $\overline{Q}$ output signal d is at the low level, the loop switch 4 is set in the OFF state (i.e. the open state).

The output signal from the motor drive circuit 8 is supplied to a slider motor 10, which drives a slider (not shown in the drawings) which carries the pickup and which is slidably movable along a radial direction of a recording disk. The motor drive circuit 8 detects an amount of displacement of the tracking actuator 6, based on the output signal from the equalizer 5, and drives the pickup radially across the disk by means of the slider motor 10, until the amount of positional displacement becomes zero, i.e. until the pickup becomes positioned at the center of a range of movement of the tracking actuator 6. In addition, the motor drive circuit 8 responds to a scan command by moving the slider radially across the disk towards either the outer or the inner periphery of the disk, at a fixed predetermined speed.

The operation of the various sections of this prior art example will be described referring to the waveform diagrams of FIGS. 2A to 2E. FIG. 2A shows the waveform of output signal a from the equalizer 5. FIG. 2B shows the waveform of the tracking error signal b, FIG. 2C shows the output signal c from the window comparator 7, FIG. 2D shows the $\overline{Q}$ output d of the monostable multivibrator 9, and FIG. 2E shows the waveform of the video signal e which is produced from the FM demodulator 3.

When a scan command is issued, the slider is moved for example towards the outer periphery of the disk by the motor drive circuit 8. When this occurs, the level of the output signal a from the equalizer 5, which is supplied as a drive signal to the tracking actuator 6 increases at a rate whose slope is in accordance with the velocity of displacement of the slider. As a result, the amount of displacement of the tracking actuator 6 becomes large. However when the absolute value of the output a from the equalizer 5 reaches a predetermined value, the output signal c from the window comparator 7 goes to the high level. When this occurs, the monostable multivibrator 9 is triggered, whereby the $\overline{Q}$ output d thereof goes to the low level during a time interval $T_1$ which is determined by the time constant of monostable multivibrator 9. As a result, the loop switch 4 is held in the OFF state during the time interval $T_1$, and hence the tracking servo loop is held in the open state. As a result, the position of the tracking actuator 6 is restored to the center of the range of movement thereof. In this way, the data sensing light spot of the pickup is displaced by jumping over a number of recording tracks.

When the monostable multivibrator 9 switches back to the stable state thereof, so that the loop switch 4 is again closed, the tracking servo loop is thereby closed and hence the data sensing light spot of the pickup again becomes positioned above a recording track so that read-out of data from the track can begin.

High-speed data playback can be performed by the operation described above. However, while the loop switch 4 is in the open state, the video signal e produced as output from the FM demodulator 3 does not provide a normal display of data, and noise is produced within that signal. In order to reduce the effects of such noise, the period of repetition of the time intervals ($T_2$) during which the tracking servo loop is held in the open state can be made of sufficient duration by suitably setting the value of the reference level of the window comparator 7. However if this is done, then it is necessary to extend the range of movement of the actuator, and the field of view of the pickup. In addition, when the tracking servo loop is in the open state for too long duration, a large number of tracks are jumped over by the data sensing light spot of the pickup, so that continuity of the playback image is not maintained, and it is difficult for the user to search for a desired display image.

Furthermore, it is difficult to adjust the speed of such high-speed playback, due to manufacturing deviations in the characterisitics of the slider motor.

Moreover in the case of a video signal which is read out from a memory, the frequency range of the playback signal is more limited than that of the original signal which is written into the memory, with this range of frequencies which can be played back being dependent upon the sampling period. For this reason, it is undesirable to utilize storage in a memory, since this is disadvantageous with regard to attaining high resolution of a display image.

SUMMARY OF THE INVENTION

It is an objective of the present invention to provide a scanning method for a disk player whereby a stable reproduction display image can be obtained during scanning operation, with the reproduction image being free from noise.

It is a further objective of the present invention to provide a scanning method for a disk player whereby adjustment of the speed of high-speed reproduction can be easily carried out.

It is a further objective of the present invention to provide a scanning method for a disk player whereby a display image is produced during high-speed reproduction which is free from disorder, and moreover whereby a high degree of playback image display resolution is attained during normal-speed reproduction operation.

The method of the present invention is characterized in that a "loop open" command is generated with a predetermined period, a tracking servo loop is set in the open state in response to the "loop open" command, and when a predetermined time interval elapses after termination of the "loop open" command, a predetermined amount of video data obtained from a recording disk is written into a memory, and the video data thus stored in the memory is repetitively read out.

The method of the present invention is further characterized in that previous contents of a video memory are replaced by writing into the memory at least one field of video data obtained from a recording disk during playback operation, and in that multi-track jumping is executed by performing a predetermined number of operations in which a data sensing light spot is caused to jump over a predetermined number of recording disk tracks, while at the same time stored data of a video memory is repetitively read out to be utilized as reproduction data.

Furthermore according to an embodiment of the invention, a video memory is not utilized during normal-speed reproduction operation. During scanning operation, track jumping operations are succesively performed with a predetermined repetition period, these track jumping operations alternating with intervals of play operation. During each of these intervals of play operation, upon the elapse of a time interval from the point of termination of track-jumping operation, at least one field of data obtained from a recording disk is written into the video memory to replace previous contents of the memory. During the successive track jumping and play operation intervals of scanning operation, the video data contents of the memory are repetitively read out, to produce an output reproduction video signal from the disk player.

BRIEF DESCRIPTION OF THE DRAWINGS

FIG. 15 is a waveform diagram of signal waveforms of the disk player of FIG. 9 for the fifth embodiment.

DESCRIPTION OF THE PREFERRED EMBODIMENTS

Figure 3:
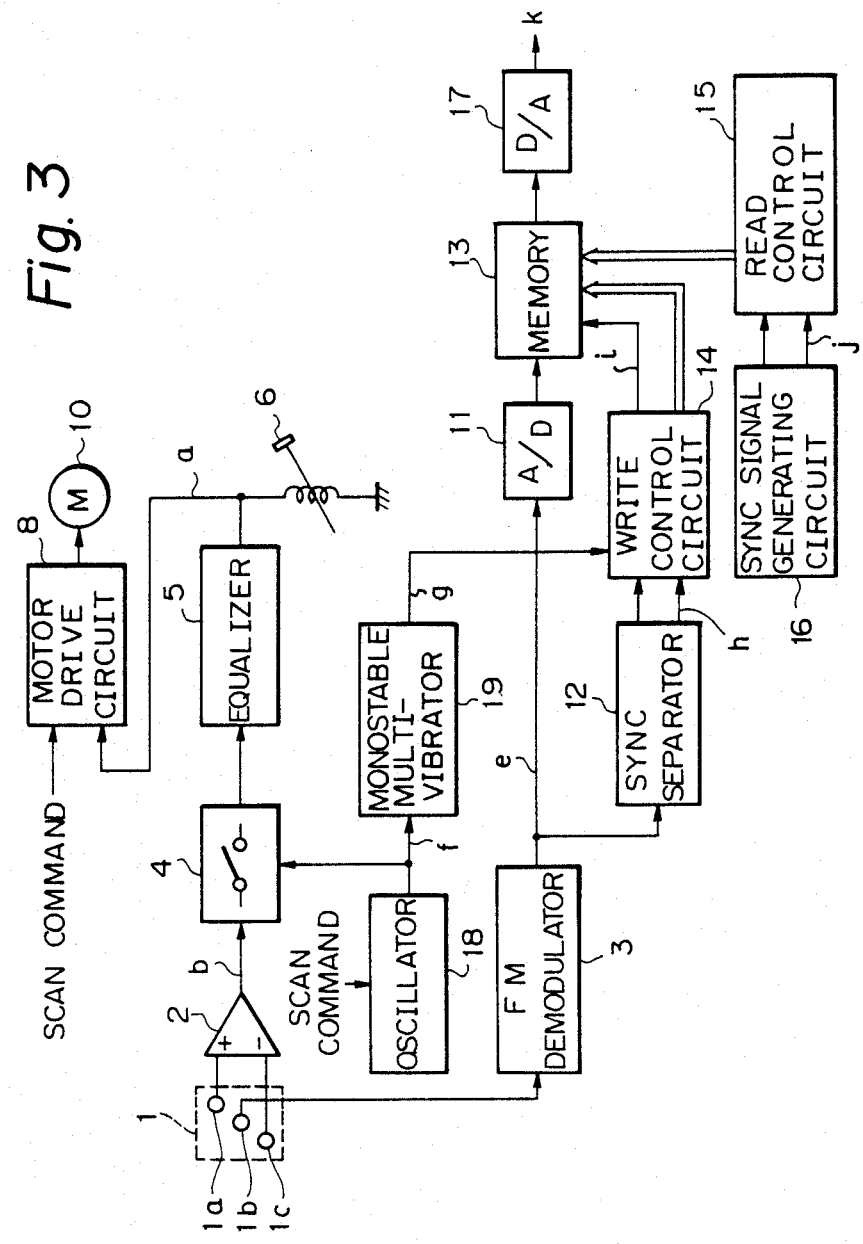
FIG. 3 is a block circuit diagram of a disk player which utilizes a first embodiment of a scanning method according to the present invention.

Embodiments of the present invention will be described in the following referring to the drawings. FIG. 3 is a block circuit diagram of a disk player which utilizes a first embodiment of a scanning method according to the present invention. In FIG. 3, the elements 1a, 1b and 1c of a photodetector 1, as well as a subtractor circuit 2, a FM demodulator 3, a loop switch 4, a equalizer 5, a tracking actuator 6, an motor drive circuit 8, and a slider motor 10 respectively correspond to the identically numbered components in the prior art example of FIG. 1, and are connected in the same manner, so that further description will be omitted. However in this embodiment of the present invention, the video signal which is produced from the FM demodulator 3 is supplied to an A/D converter 11 and to a sync separator circuit 12. The A/D converter 11 performs sampling of the video signal at predetermined time intervals, and converts the sample values thus obtained into digital data. The output data from the A/D converter 11 is supplied to a memory 13, which is coupled to receive output signals from a write control circuit 14 and a read control circuit 15, which execute mode control and address control of memory 13. Horizontal and vertical sync signals which are separated by the sync separator circuit 12 are supplied to the write control circuit 14.

The write control circuit 14 is configured such as to produce a Write Enable signal and at the same time to produce address data which change sequentially with a predetermined period during an interval extending from the point in time at which a first vertical sync signal pulse is supplied thereto after a write command has been issued, until the succeeding vertical sync signal pulse is generated. The output data from the write control circuit 14 are produced by a counter which counts up clock pulses which have a predetermined frequency, and is reset by each horizontal sync signal pulse, and another counter which counts up the horizontal sync signal pulses and is reset by the vertical sync signal. The write control circuit 14 acts to write into the memory 13 data that include one field of video data. A read control circuit 15 is supplied with a vertical sync signal and horizontal sync signal which are generated by a sync signal generating circuit 16. The read control circuit 15 is configured such as to generate address data which vary in synchronism with the vertical sync signal and horizontal sync signal supplied thereto. The output data from the read control circuit 15 can be generated in the same manner as the output data from the write control circuit 14. The read control circuit 15 controls the operation of the memory 13 such that data including one field of video data that has been written into the memory 13 is sequentially read out from the memory 13 and supplied to the D/A converter 17, once in every predetermined number of successive bits. The D/A converter 17 serves to convert the data which is read out from the memory 13 into an analog signal, and to thereby produce a video signal k.

The output signal f from an oscillator 18 is supplied as a control signal to the loop switch 4, and is also supplied as a trigger input signal to a monostable multivibrator 19. A write command signal is thereby supplied to the write control circuit 14 from the $\overline{Q}$ output terminal of the monostable multivibrator 19.

Figure 4:
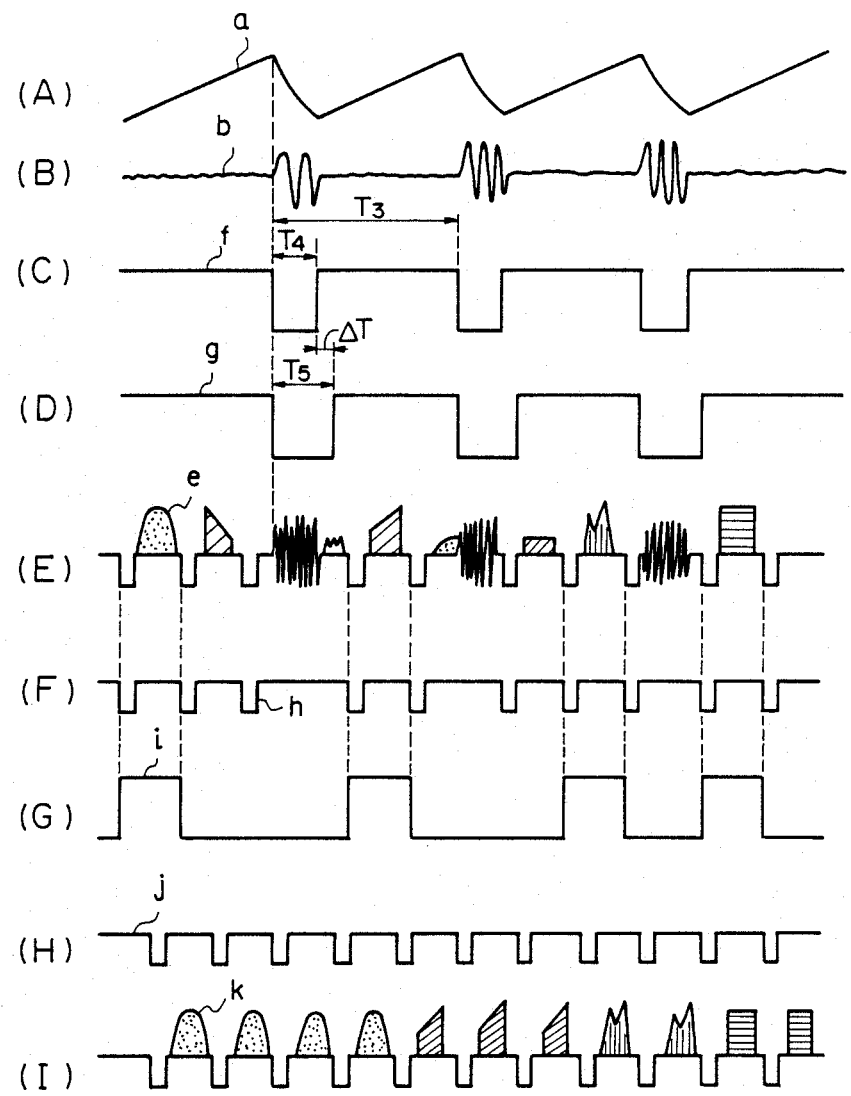
FIG. 4 is a waveform diagram for assistance in describing the operation of the embodiment of FIG. 3.

The operation of the respective sections of this embodiment will be described referring to the waveform diagrams of FIG. 4. FIG. 4A is a waveform diagram of the output signal a from the equalizer 5, FIG. 4B is a waveform diagram of the tracking error signal b, FIG. 4C is a waveform diagram of the oscillator output signal f from the oscillator 18, FIG. 4D is a waveform diagram of the $\overline{Q}$ output g of the monostable multivibrator 19, FIG. 4E is a waveform diagram of the video signal e from the FM demodulator 3, and FIG. 4F is a waveform diagram of the vertical sync signal h which is produced from the sync separator circuit 12. FIG. 4G is a waveform diagram of the Write Enable signal i, FIG. 4H is a waveform diagram of the vertical sync signal j from the sync signal generating circuit 16, and FIG. 4I is a waveform diagram of the video signal k from the D/A converter 17.

Figure 1:
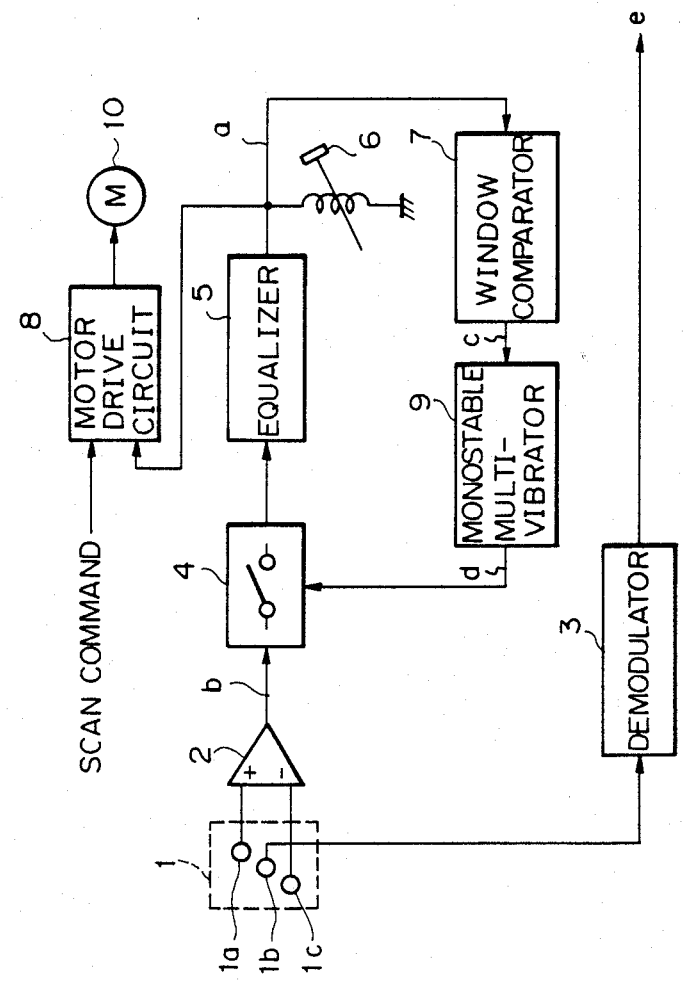
FIG. 1 is a block circuit diagram of a prior art example of a disk player.
Figure 2:
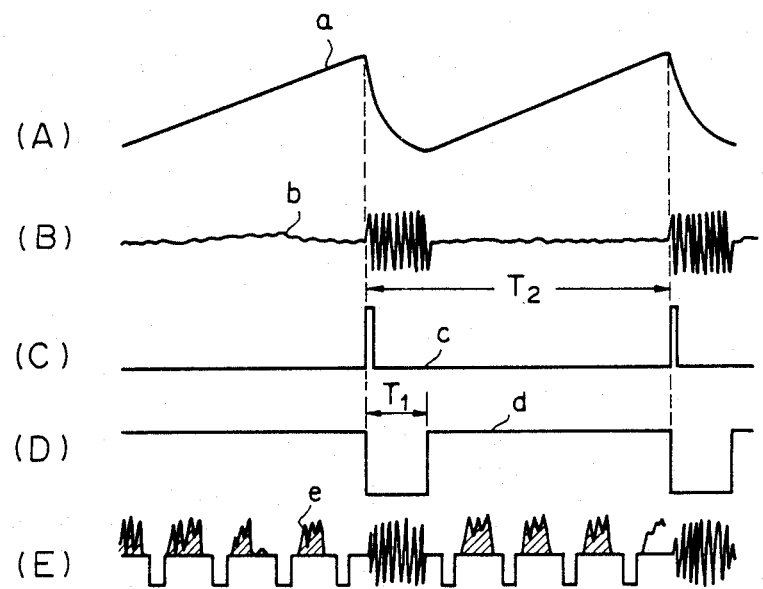
FIG. 2 is a waveform diagram for assistance in describing the operation of the example of FIG. 1.

When a scan command is issued, the slider is driven by the motor drive circuit 8 in the same way as in the example of FIG. 1, for example to be moved towards the outer periphery of the recording disk. When this takes place, the level of the output signal a from the equalizer 5, which is applied as a drive signal to the tracking actuator 6, increases at a rate whose slope is determined by the speed of movement of the slider, and the amount of displacement of the tracking actuator 6 thus becomes large. At the same time, oscillation operation of the oscillator 18 is started, with an oscillation signal f being produced which has a period of T3 and which goes to a low logic level (referred to in the following as the low level) during successive intervals of duration T4, with each of these low-level intervals of signal f representing a "loop open" command. As a result of such a "loop open" command, the loop switch 4 is held in the OFF state during a time interval T4, with the tracking servo loop being thereby held in the open state. As a result, the position of the tracking actuator 6 is restored to the center of the range of movement thereof, whereby a track jump movement of the data sensing light spot of the pickup across the recording tracks of the disk is executed in the same way as described for the prior art example of FIG. 1.

When the oscillation output signal f returns to the high level, the loop switch 4 becomes closed, whereby the tracking servo loop is closed and normal read-out of data from the recording disk begins. This mode of normal reproduction operation will be referred to in the following simply as "play" operation, as distinguished from track jumping operation.

When the oscillation output signal f goes to the low level, the monostable multivibrator 19 is triggered, so that the $\overline{Q}$ output g from the monostable multivibrator 19 goes to the low level during a time interval T5 which is determined by the time constant of the monostable multivibrator 19. When this $\overline{Q}$ output g then returns to the high logic level (referred to in the following as the high level), the Write Enable signal i from the write control circuit 14 is produced (more precisely, goes to the high level) in synchronism with the first pulse of vertical sync signal h which is produced from the sync separator circuit 12. The Write Enable signal i continues to be output (i.e. remains at the high level) until the next pulse of the vertical sync signal h is produced. In response to this Write Enable signal i, data including one field of video data is written into the memory 13.

In this way, if the time interval T5 is made longer than the time interval T4 by the amount ΔT that is required between the point of closure of the tracking servo loop and the point at which servo loop lock is attained, then data which is free from noise can be stored in the memory 13. This data is subsequently read out by means of address data that is generated in accordance with the vertical sync signal j produced from the sync signal generating circuit 16, whereby a video signal k that is free from noise is produced from the D/A converter 17.

Figure 5C:
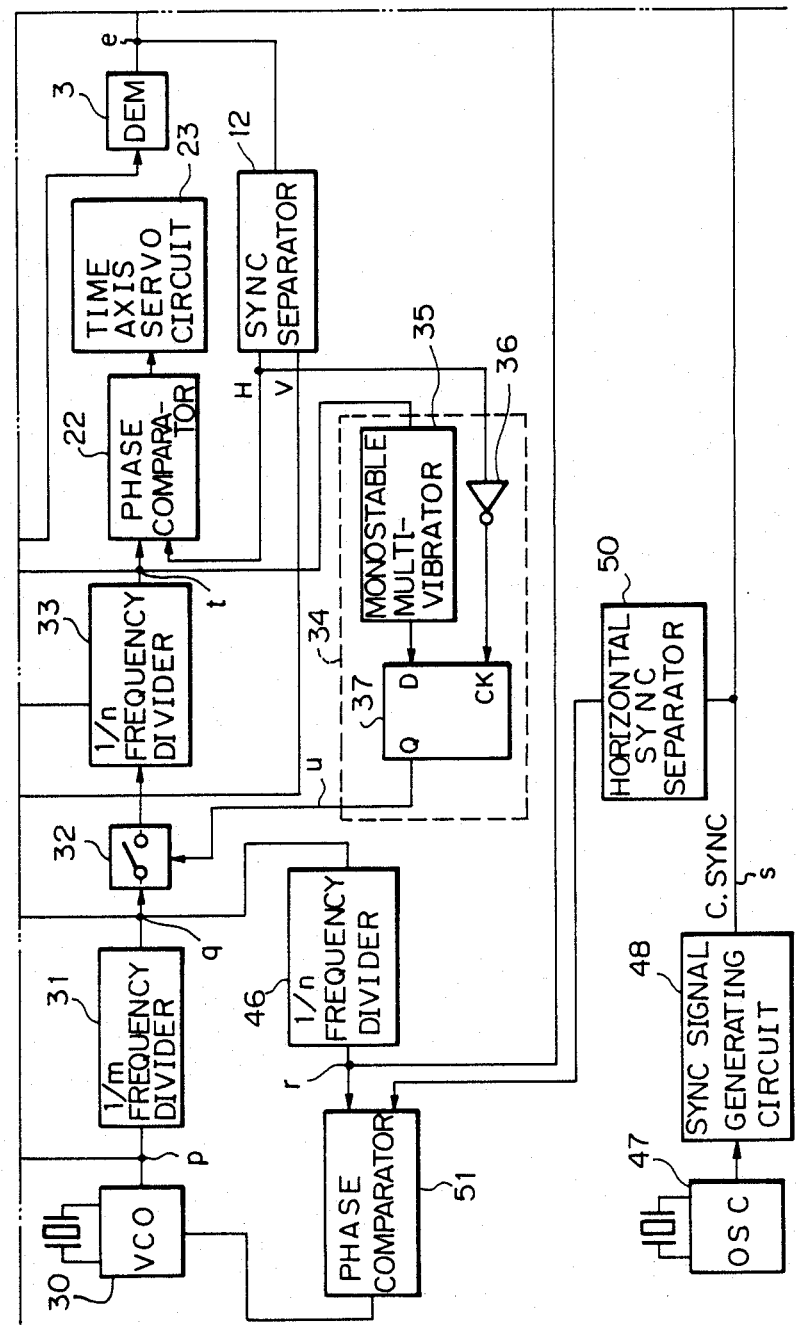
FIGS. 5A and 5B are a block circuit diagram of a disk player for implementing a second embodiment of a scanning method according to the present invention.
Figure 5D:
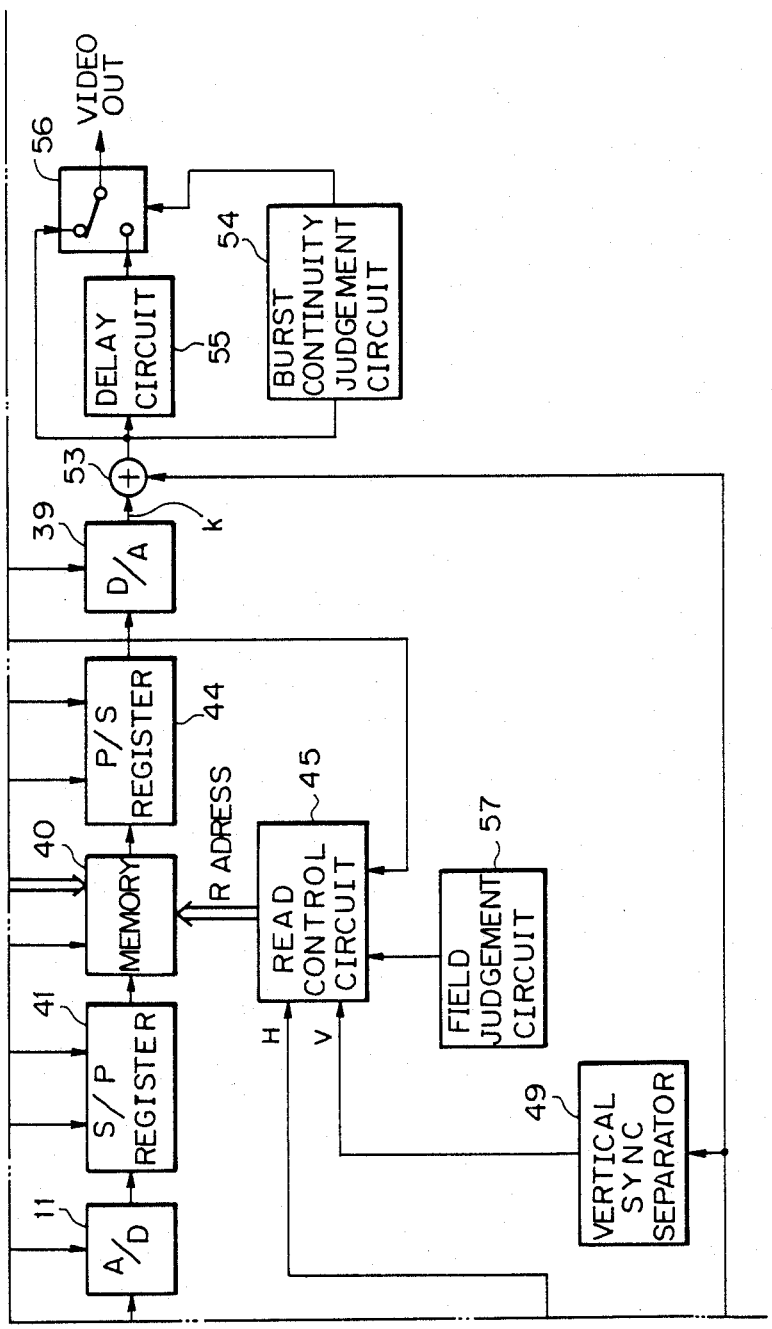

FIG. 5 is a block circuit diagram of a disk player for implementing a second embodiment of a scanning method according to the present invention. The elements 1a, 1b and 1c of the photodetector 1, the subtractor circuit 2, the FM demodulator 3, the loop switch 4, the equalizer 5, the tracking actuator 6, the motor drive circuit 8, the slider motor 10, the A/D converter 11, the sync separator circuit 12, the oscillator 18, and the monostable multivibrator 19 respectively correspond to the identically designated components in the disk player of FIG. 3, and are connected in the same manner. However in this second embodiment, the horizontal sync signal H that is produced from the sync separator circuit 12 is supplied to a phase comparator 22, for thereby detecting the phase difference between the horizontal sync signal H and a reference signal (described hereinafter). The phase difference signal that is thereby produced from the phase comparator 22 is supplied to a time axis servo circuit 23, to execute control of the speed of rotation of a spindle motor which rotates the recording disk, or for drive control of an actuator of a tangential servo system, etc.

Reference numeral 30 denotes a reference frequency oscillator, configured as a VCO (voltage control oscillator), which generates a reference clock signal p at a frequency which is N times the horizontal scanning frequency $f_H$, where $f_H$ is usually 15.734 KHz and N is an integer equal to 2 or greater and which is equal to m×n (defined hereinafter). The reference clock signal p is frequency-divided by a frequency divider 31 by a factor 1/m (where m is an integer equal to 2 or greater), to produce a clock signal q. The clock signal q is selectively transferred through a switch 32 (serving as gating means) to a frequency divider 33, and is further frequency-divided in the frequency divider 33 by a factor of 1/n (where n is an integer equal to 2 or greater), to thereby produce a clock signal t at the horizontal scanning frequency $f_H$. This frequency-divided clock signal t is used as a reference signal by the phase comparator 22 described hereinabove, i.e. serves as a time axis reference for the time axis servo system.

The switch 32 is held in the closed (i.e. ON) state during normal playback of data recorded on a disk. ON/OFF control of the switch 32 is executed by control circuit 34. During a track jump operation in high-speed playback operation, switch 32 is closed during at least the period of the jump, to thereby supply the frequency-divided clock signal q to the frequency divider 33. The control circuit 34 consists of a monostable multivibrator 35 which is triggered on each falling edge of the output signal from the oscillator 18, to thereby generate a single pulse of predetermined pulse width, a D-type flip-flop 37 which receives these pulses from multivibrator 35 at a data input terminal, and an inverter 36 which receives the horizontal sync signal H from the sync separator circuit 12 and transfers the inverted signal to the clock input terminal of flip-flop 37. A control signal for the switch 32 is thereby produced from the Q output of flip-flop 37.

The reference clock signal p produced by the reference oscillator 30 serves as a time axis reference for the servo system, as described above, and moreover is supplied to the A/D converter 11 and a D/A converter 39 which respectively perform A/D and D/A conversion of the video signal from the FM demodulator 3. In addition, the reference clock signal p is frequency-divided by the factor 1/m in the frequency divider 31, and the resultant frequency-divided signal is supplied as a Read/Write (W/R) clock signal q of the memory 40 to a S/P (serial-to-parallel) register 41 and a write control circuit 42, and is also transferred through an inverter 43 to a P/S (parallel-to-serial) register 44 and a read control circuit 45. Each of the write control circuit 42 and read control circuit 45 is configured in the same way as the write control circuit 14 and the read control circuit 15 of the disk player of FIG. 1. During each interval when the W/R clock signal q is at the high level, m samples of serial data from the A/D converter 11 are converted into parallel data and transferred from the output of the S/P register 41 to the memory 40 and be written therein. Conversely, during each interval in which the W/R clock signal q is at the low level, m samples of data are read out in parallel from the memory 40 and transferred into the P/S register 44.

As will be clear from the above description, time axis servo control is executed based on time axis reference pulses t which are derived by frequency division of the reference pulses p that are produced from the reference oscillator 30, so that the video signal e is synchronized in a specific phase relationship with the time axis reference pulses t that are produced from the frequency divider 33. This signifies that the video signal e is synchronized in a specific phase relationship with the W/R clock signal q produced from the frequency divider 31, and with the reference pulses p produced from the reference oscillator 30.

Thus, the vertical sync signal pulses which are separated by the sync separator circuit 12 from the video signal e an the time axis reference pulses t are used respectively as horizontal and vertical reset pulses for the write control circuit 42. By resetting the write control circuit 42 in this way, a fixed 1:1 relationship is established between write-in to the image plane and write-in to the memory plane, i.e. a memory-mapped condition is established. It is possible to envisage a method whereby the horizontal sync signal pulses separated by the sync separator circuit 12 from the video signal e are used as horizontal reset pulses for the write control circuit 42. However phase deviations would be produced in this case between the time axis reference pulses t and the video signal e, due to such factors as drift in the phase synchronization of the time axis servo system, etc. The relationship between the W/R clock signal q and the time axis reference pulses t is fixed by the frequency divider 33, so that there is no particular uncertainty in this regard. However the absolute relationship between the video signal e and the W/R clock signal q is determined indirectly, by the time axis servo system, and hence if the write control circuit 42 were to be reset by horizontal sync signal pulses derived from the video signal e, the timings at which resetting occurs would not be limited to only the points at which completion of the W/R operation cycle occurs. Thus, problems would arise.

It is preferable to use the time axis reference pulses t as horizontal reset pulses for the write control circuit 42, since in this case the absolute phase relationship with the W/R clock signal q will be preserved, and the operation will not suffer adverse effects from noise contained in the playback signal.

With regard to read-out from the memory, on the other hand, video data is read out from the memory 40 during each interval in which the W/R clock signal q is at the low level, and is converted to an analog video signal by the D/A converter 39. The read control circuit 45 determines the addresses for read-out of data from the memory 40, and the read control circuit 45 utilizes the same W/R clock signal q for counting as the write control circuit 42 does. However the horizontal reset pulses that are applied to the read control circuit 45 are obtained by 1/n frequency division of the W/R clock signal q in a frequency divider 46, which produces frequency-divided pulses r, while the vertical reset pulses of the read control circuit 45 are derived by separation (in a vertical sync separator circuit 49) of the vertical sync signal from the composite sync signal s that is generated by sync signal generating circuit 48. This composite sync signal s is generated by the sync signal generating circuit 48 based on a signal of frequency 910 $f_H$ that is produced from oscillator 47.

The horizontal sync signal pulses contained in the composite sync signal s are separated by horizontal sync separator circuit 50, and are supplied to a phase comparator 51 in which phase comparison is performed between the horizontal sync signal pulses and the frequency-divided pulses r from the frequency divider 46. The phase comparator 51 controls the oscillation frequency of the reference oscillator 30 in accordance with the phase difference between these pulses, to thereby phase-synchronize the horizontal reset pulses from the read control circuit 45 and the composite sync signal s.

In this way, the horizontal and vertical reset pulses of the read control circuit 45 are determined by the composite sync signal s, which is a fixed and continuous signal, irrespective of the sync signals contained in the video signal e that is read out from the recording disk. During memory write-in, since there is a fixed 1:1 relationship maintained between the image plane and the memory plane (as described above), a continuous image can be obtained by sequentially reading out data from the memory plane by means of the read control circuit 45.

Figure 6:
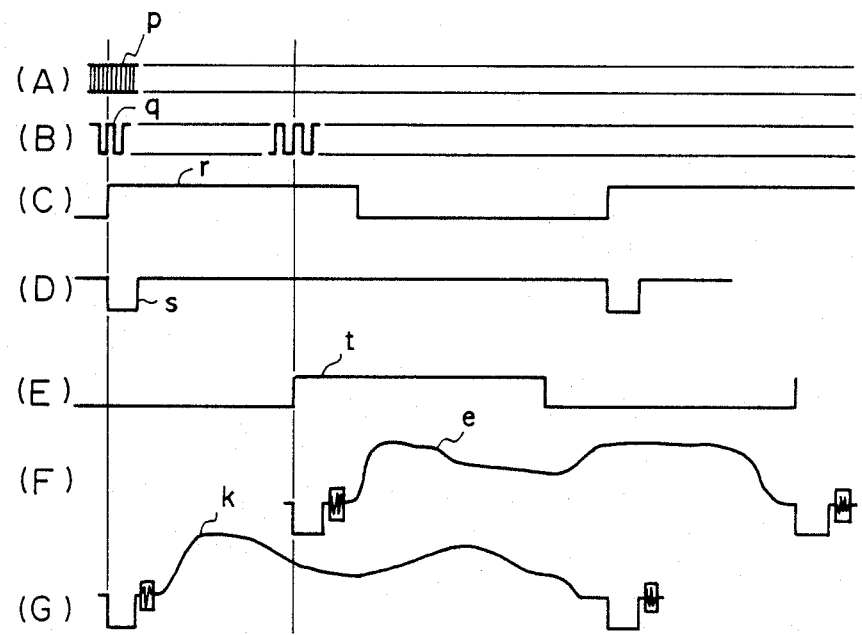
FIG. 6 is a waveform diagram for assistance in describing the operation of the second embodiment.
Figure 7:
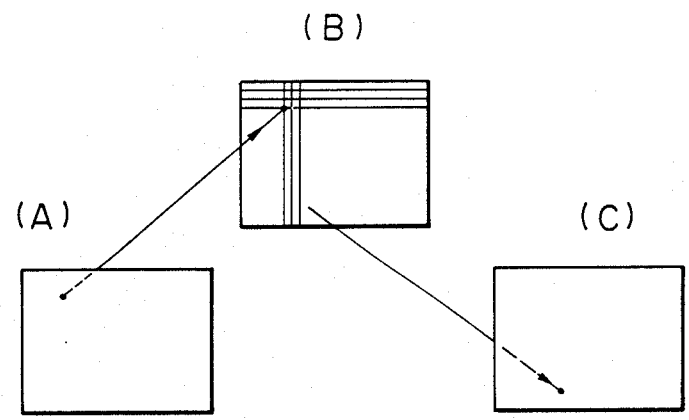
FIG. 7 is a diagram showing positional relationships between respective data on a display plane and a memory plane.

The operation during normal playback (i.e. normal-speed playback in which data are read out from a disk by the pickup, with the tracking servo loop in the closed state, such operation being referred to hereinafter simply as "play" operation) has been described in the above. The signal waveforms for respective sections of the circuit of this embodiment are shown in FIG. 6, for the case of normal playback operation. FIG. 6A is a waveform diagram of the reference clock signal p, FIG. 6B is a waveform diagram of the frequency-divided clock signal q, FIG. 6C is a waveform diagram of the frequency-divided pulses r, FIG. 6D is a waveform diagram of the composite sync signal s, FIG. 6E is a waveform diagram of the time axis reference pulses t, FIG. 6F is a waveform diagram of the video signal e, and FIG. 6G is a waveform diagram of the video signal k. FIGS. 7A, 7B and 7C respectively illustrate the playback image plane corresponding to a video signal which is produced from the FM demodulator 3, the memory plane, and the image plane which is obtained from the memory oupput.

Figure 8:
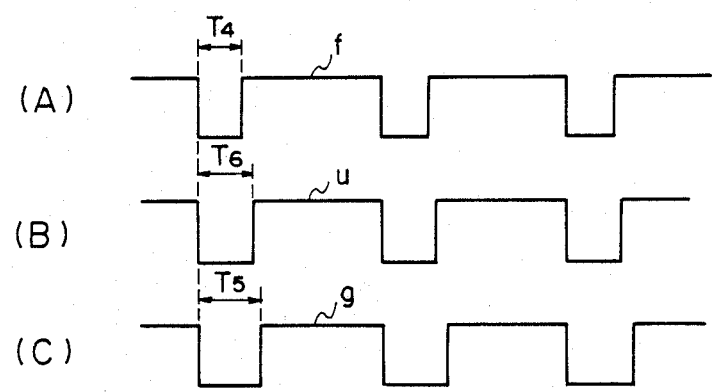
FIG. 8 is a waveform diagram for assistance in describing the operation of the second embodiment of FIG. 5 during scanning operation.

During scan operation, as in the case of the disk player of FIG. 3, the monostable multivibrator 35 is triggered when the oscillation output signal f goes to the low level, whereby a negative-going pulse of predetermined pulse width is supplied to the D-type flip-flop 37, as seen in FIG. 8A. When this occurs, the Q output signal u of the D-type flip-flop 37 goes to the low level during a time interval $T_6$ which is identical to the pulse width of the aforementioned negative-going pulse, whereby the switch 32 is set in the open state, as seen FIG. 8B. As a result, operation of the time axis servo is halted in synchronism with a horizontal sync signal pulse produced from the sync separator circuit 12, and writing into the memory 40 is inhibited.

The duration of the time interval $T_6$ for which the Q output u is at the low level is made intermediate between the time duration $T_4$ for which the oscillation output f is at the low level and the time interval $T_5$ for which the $\overline{Q}$ output g of the monostable multivibrator 19 is at the low level. In that case, the commencement of operation of the time axis servo after the Q output u goes to the high level will occur after a certain time interval has elapsed following closure of the tracking servo loop. Thus, the time axis servo will lock-in almost immediately. In addition, the write command is issued to the write control circuit 42 when the $\overline{Q}$ output g goes to the high level, after the time axis servo has locked in. Thus, data including one field of video data is written into the memory 40 without any time axis deviations, and without any noise being contained in the data, as in the case of the disk player of FIG. 3. In this way, during scan operation, a stable video signal is also obtained which is free from noise and time axis errors.

The division ratio m of the frequency divider 31 expresses a number of samples for one block of quantized data which is subjected to serial-to-parallel conversion. Suitable values for m are 4 or 8, typically. The product of this division ratio value m and the division ratio n of the frequency divider 33 determines the sampling frequency of the video signal. In the case of an optical type of video disk, the lower end of the image frequency range is approximately 4.2 MHz, so that in accordance with sampling theory, a frequency of $2 \times 4.2$ MHz$=8.4$ MHz or higher is necessary. On the other hand if the sampling frequency is made too high, then an excessively large amount of memory capacity will be required, in order to record one field or one frame of the video signal. Taking the latter point into consideration, the sampling frequency should preferably be selected to be as low as practicable. For these reasons, the sampling frequency is preferably in the range 8.81 to 9.31 MHz, using values of m$=8$, and n$=70$ to 74.

The video signal k which is produced from the output stage of the D/A converter 39, after read-out from the memory 40, is added to the composite sync signal s in a summing circuit 53. This is done in order to reduce the amount of capacity required in the memory 40, i.e. since the horizontal sync signal and vertical sync signal components of the video signal are not stored in the memory 40.

During high-speed reproduction operation, the video signal k is read from the memory 40 only during intervals in which write-in to the memory 40 is inhibited by the write control circuit 42. As a result, continuity of the burst phase of the video signal is lost, and the phase may become inverted. This can result in loss of color synchronism of the TV display, and for this reason a burst continuity judgement circuit 54 is utilized, to judge whether color burst continuity is maintained, and to select either the input or the output of a 140 nsec delay line 55 by means of a selector switch 56 in accordance with the judgement results, to thereby ensure continuity of the burst phase.

If the memory capacity corresponds to one field of the video signal, then there is a possibility of portions of fields becoming interchanged between write-in and read-out from the memory. For this reason, a field judgement circuit 57 is provided in order to control the vertical starting position of the read control circuit 45, such as to prevent mutual interchange of relationships between upper and lower portions of the display image as each field is read out of the memory.

In the first and second embodiments of the present invention described above, one field of the video signal is written into the memory 13 or memory 40. However it would be equally possible to arrange such that an amount of video data corresponding to a portion of one display picture, e.g. one horizontal scanning line, is written into the memory 13 or 40.

With a scanning method according to the embodiments of the present invention described above, a "loop open" command is issued for a predetermined time interval, whereby a tracking servo loop is set in the open state, and a predetermined amount of video data obtained from a recording disk is written into a memory when a predetermined time interval has elapsed from the point at which the "loop open" command is terminated, and the video data thus written into the memory is then repetitively read out of the memory. As a result, a display picture is obtained which is free from noise or disturbances during scan operation, irrespective of whether the recording disk is a CAV or a CLV disk.

Thus with a scanning method according to the above embodiments of the present invention, it is not necessary to make the repetition period $T_3$ of the intervals in which the tracking servo loop is held in the open state excessively long, in order to reduce noise and disturbance in the display picture, and $T_3$ can be made as short as approximately 50 msec. Even with such a short value of $T_3$, one field of the video data can be written into the memory during that period, and a satisfactory display picture can be obtained. Thus, it is not necessary to widen the range of movement of the tracking actuator, or the field of view of the optical system, for reasons connected with scan operation. Reduction of manufacturing cost and increased quality can thereby be attained. Furthermore, the number of tracks which are jumped over while the tracking servo loop is in the open state is reduced, whereby continuity of the display picture during scan operation can be preserved. A desired display image can thereby be readily searched for, so that the invention leads to enhanced ease of operation.

Figure 9B:
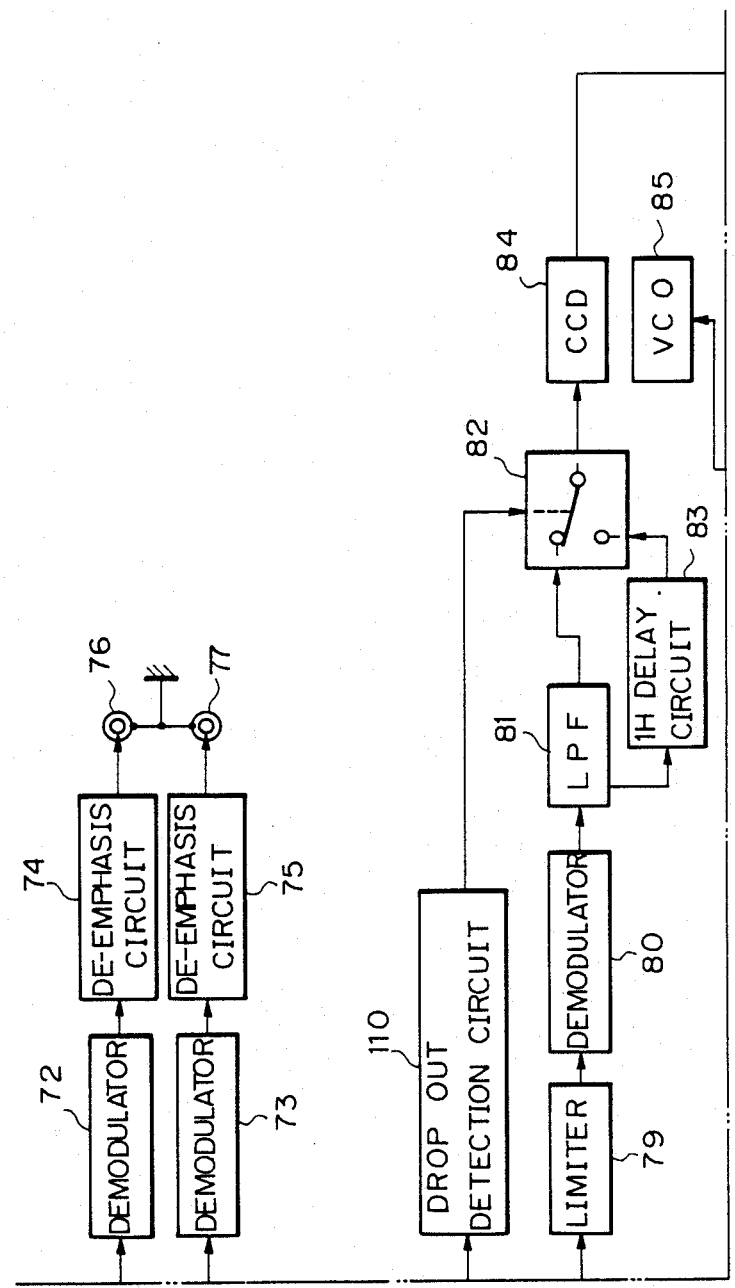
FIGS. 9A and 9B are a block circuit diagram of a a disk player for implementing third, fourth and fifth embodiments of a scanning method according to the present invention.
Figure 9D:
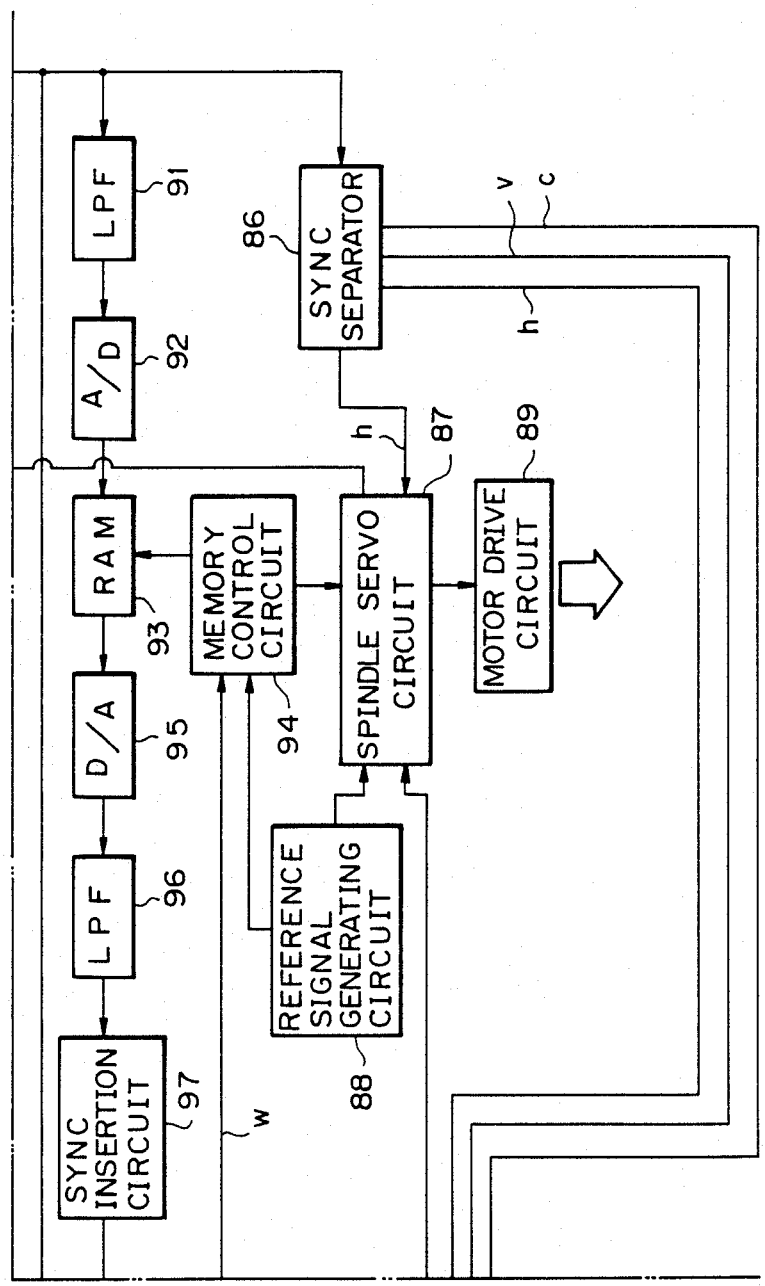

Third, fourth and fifth embodiments of a scanning method according to the present invention will now be described. FIG. 9 is a block circuit diagram of a disk player for implementing these embodiments of the invention. In FIG. 9, a recording disk 62 is rotated by a spindle motor 61 and data recorded on disk 62 are read out by an optical type of pickup 63. The internal configuration of the pickup 63 includes a laser diode, an object lens, a focus actuator, a tracking actuator, photodetector, etc. The output signal from the pickup 63 is supplied to an R.F. amplifier 64, and also to a focus servo circuit (not shown in the drawings) which in turn is connected to a tracking servo circuit 112. The focus servo circuit and the tracking servo circuit 112 drive a focus actuator and tracking actuator of pickup 63, respectively, whereby a light beam produced from the laser diode in the pickup 63 is focussed onto the recording surface of the recording disk 62 as a data sensing light spot (i.e. a data detection point), and position control of this light spot is executed to move the light spot radially across the recording disk 62 to become positioned on a recording track formed on the recording surface of disk 62. The tracking servo circuit 112 is configured such as to respond to a "tracking open" command a by opening the tracking servo loop, to thereby halt position control of the data sensing light spot.

In addition, a current detection circuit 65 is coupled to receive a flow of coil current which is supplied to a coil in the pickup 63 for driving the tracking actuator. A current sensing signal is produced from the current detection circuit 65 in accordance with the level of the coil current, and is supplied to a slider servo circuit 66. The slider servo circuit 66 performs amplification and phase compensation of the current sensing signal, and thereby produces an output signal which is transferred through a motor drive circuit 67 to be suppplied as a drive signal to a slider motor 68. The slider motor 68 drives a slider 69, which carries the pickup 63, and which is movable radially across the recording disk, while the tracking actuator in the pickup 63 is controlled such as to be positioned at the central point of the range of movement thereof. The slider servo circuit 66 is configured to respond to a "forcible transport" command signal b by forcibly moving the slider 69 radially across the recording disk 62.

An RF signal which is produced from the R.F. amplifier 64 is supplied to BPFs (band pass filters) 70 and 71 which respectively extract the right and left audio FM channel signals. These two channel signals of the audio FM signal are respectively supplied to FM demodulators 72 and 73, to thereby derive two audio channel signals, which are respectively supplied to deemphasis circuits 74 and 75 whereby signal components which were emphasized at the time of recording are restored to their original levels. The audio signals which are thus produced from the de-emphasis circuits 74 and 75 are supplied to audio output terminals 76 and 77 respectively.

The RF signal that is output from the R.F. amplifier 64 is transferred through a BPF 78 to thereby derive a video FM signal. This video FM signal is limited in amplitude by a limiter 79, and the resultant signal is supplied to an FM demodulator 80 to thereby reproduce the video signal. This video signal is transferred through a LPF (low pass filter) 81 to one terminal of a changeover switch 82 which is used for drop-out compensation. The other input terminal of the changeover switch 82 is coupled to receive the video signal after that signal has been delayed by a 1 H (i.e. one horizontal scanning interval) delay line 83. The changeover switch 82 is controlled by a control signal which is a drop-out detection signal produced from a drop out detection circuit 110. The drop out detection circuit 110 receives the high-frequency components of the RF signal that has been separated by an HPF (high pass filter) 111. The drop out detection circuit 110 is configured such as to detect drop-out on the basis of the zero-crossing points of the high-frequency components of the RF signal, and generates a drop-out detection signal in response. The changeover switch 82 is controlled by this drop-out signal, and drop-out correction is accomplished by using the changeover switch 82 to select the preceding 1 H interval of the video signal (obtained from the output of the 1 H delay line 83) when drop-out is detected.

The video signal that is output from the changeover switch 82 is supplied to a CCD (charge coupled device) 84, which is supplied with a clock signal produced from a VCO (voltage control oscillator) 85. The CCD 84 functions to delay the video signal by an amount which is determined by the frequency of this clock signal. The video signal that is output from the CCD 84 is supplied to a sync separator circuit 86 which is configured such as to separate from the video signal h the vertical sync signal and the horizontal sync signal v components thereof, as well as control data c consisting of a Phillips code, etc. The horizontal sync signal h that is produced from the sync separator circuit 86 is supplied to a spindle servo circuit 87 which performs phase comparison between the horizontal sync signal h and a reference signal having a predetermined frequency which is produced from a reference signal generating circuit 88. The spindle servo circuit 87 thereby produces a spindle error signal in accordance with any phase difference between these signals, and the spindle error signal is supplied to a motor drive circuit 89 to thereby control the speed of rotation of the spindle motor 61. At the same time, a control signal is generated in accordance with the phase difference between the horizontal sync signal h and the reference signal, and is supplied to the control input terminal of the VCO 85. As a result, the frequency of oscillation of VCO 85 is established in accordance with the phase difference between the horizontal sync signal h and the reference signal, so that the delay time of the CCD 84 is varied in accordance with this phase difference and time axis errors are thereby eliminated.

After removal of time axis errors by the CCD 84 in this way, the video signal is supplied to one input terminal of a changeover switch 90, and is also transferred through a LPF 91 to an A/D converter 92. The A/D converter 92 performs sampling of the video signal with a predetermined sampling period, and sequentially converts the sample values into digital data. The output data from the A/D converter 92 is supplied to a RAM (random access memory) 93 which is used as a video memory. Address control and mode control of the RAM 93 are executed by a memory control circuit 94, which operates based on a clock signal supplied from the reference signal generating circuit 88 and is configured such as to perform sequential read-out of data that has been written into respective addresses of the RAM 93, and to re-write the contents of respective addresses of RAM 93 in response to a Write Enable signal w. Data which are read out from the RAM 93 are supplied to a D/A converter 95 to be converted to an analog signal, which is transferred through a LPF 96 to a sync insertion circuit 97. The sync insertion circuit 97 acts to add sync signals to this analog signal, to thereby regenerate the video signal, which is supplied to the other input terminal of the changeover switch 90. The changeover switch 90 is controlled by a changeover control signal d produced from a system controller 100. The video signal which has been transferred through the RAM 93 and the video signal which has been directly output from the CCD 84 are applied to respectively input terminals of the changeover switch 90, and one of these signals is thereby selected to be supplied to a character insertion circuit 101. The character insertion circuit 101 produces a video signal corresponding to character data (sent from the system controller 100) and combines this with the video signal which is selected to be output by the changeover switch 90. The video signal thus produced as output from the character insertion circuit 101 is applied to a video output terminal 102. The system controller 100 consists of a microcomputer made up of a processor, ROM, RAM, programmable timer, etc, and is coupled to receive sync signals and control data which are produced from the sync separator circuit 86, data produced from a set of operating key switches 108 in accordance with key actuations, loading detection data from a loading mechanism, and a disk detection signal, etc. The processor of the system controller 100 performs processing of these input signals in accordance with programs which are stored in the ROM, and controls the slider servo circuit 66, the spindle servo circuit 87, the changeover switch 90, the memory control circuit 94, the character insertion circuit 101, a drive circuit 103 which drives the laser diode, a Track Jump drive circuit 104 which drives the tracking actuator in response to "jump" commands, a motor drive circuit 106 which drives a motor 105 of the disk loading mechanism, a display circuit 107, and a tracking servo circuit 112. A voltage $V_{cc}$ is applied to a power supply terminal of the system controller 100 through a diode D, with a capacitor C being coupled between this power supply terminal and ground potential. The diode D and capacitor C thereby constitute a back-up circuit 109 whereby power continues to be supplied to the system controller 100 after power to the disk player has been switched off.

Figure 10:
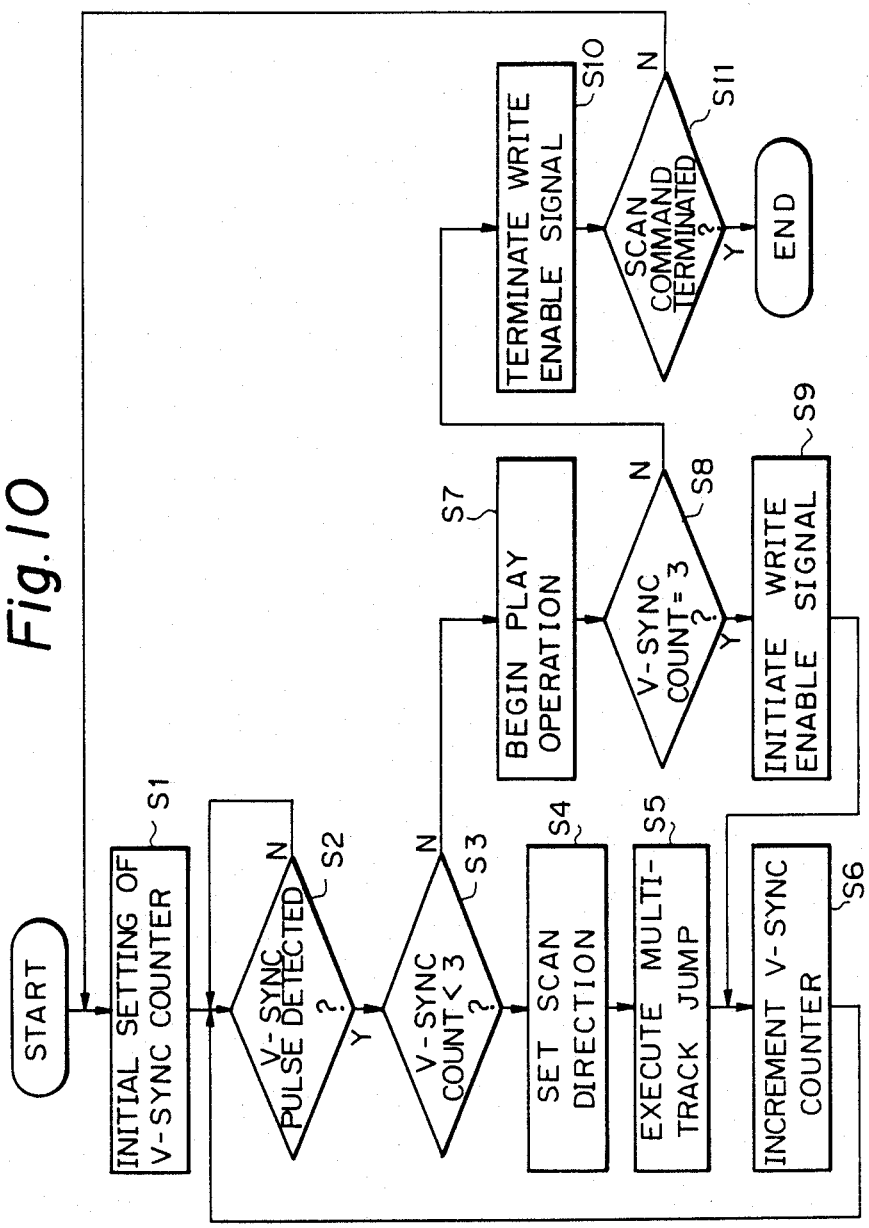
FIG. 10 is a flow chart for illustrating the operation of the third embodiment of FIG. 9.

FIG. 10 is a flow chart of the operation of the processor of the system controller 100 for the third embodiment of the scanning method of the present invention. The operating flow of the processor will be described in the following.

During play operation in which a specific routine, e.g. a main routine, is being executed, actuation of a key switch to issue a scan command will result in the processor operation moving to step S1 of FIG. 10, in which initial setting is performed of the contents of an address in the RAM of the system controller 100 which is used as a vertical sync (V sync) counter. The processor operation then moves to step S2, to judge whether or not a pulse of the vertical sync signal v is being output from the sync separator circuit 86. If it is judged in step S2 that a pulse of the vertical sync signal v is not being produced, then the processor repetitively executes step S2 thereafter, and operation moves to step S3 only when it is judged that a vertical sync signal pulse is being produced. In step S3 a decision is made as to whether or not the count value held in the vertical sync counter is less than 3. If it is judged in step S3 that this count value is less than 3, the processor operation then moves to step S4 in which the scan direction is set identical to that designated by the scan command, and the processor causes the video signal to be read out from RAM 93 as the reproduction video signal. The processor operation then moves to step S5, in which a sequence of "one-track jump" command pulses p are issued from the track jump drive circuit 104. Each of these pulses p causes the data sensing light spot of the pickup to jump over one recording track, and in this example a sequence of 15 of these pulses occurring once per millisecond is produced to execute a multi-track jump. The processor operation then moves to step S6 in which one is added to the count value held in the vertical sync counter and each of the steps from step S2 thereon is again executed If it is judged in step S3 that the count value in the vertical sync counter is not less than 3, the processor operation then moves to step S7 in which control of the various sections of the disk player is executed such that play operation is carried out, i.e. recorded data are read out from the recording disk 62 to be produced as a reproduction video signal. The processor operation then moves to step S8 in which a decision is made as to whether or not the count value in the vertical sync counter is equal to 3. If it is judged in step S8 that this count value is equal to 8, the processor operation then moves to step S9 in which transfer of the Write Enable signal w is initiated, and the processor operation then moves to step S6 again.

If it is judged in step S8 that the count value of the vertical sync counter is not equal to 3, the processor operation then moves to step S10 in which transfer of the Write Enable signal w is halted. Step S11 is then executed, in which a decision is made as to whether or not a "scan operation halt" command has been issued. If it is judged in step S11 that a "scan operation halt" command has been issued, then processor operation returns to execution of the main routine. If it is judged in step S11 that a "scan operation halt" command has not been issued, then each of the steps from step S1 thereafter is again executed.

Figure 11:
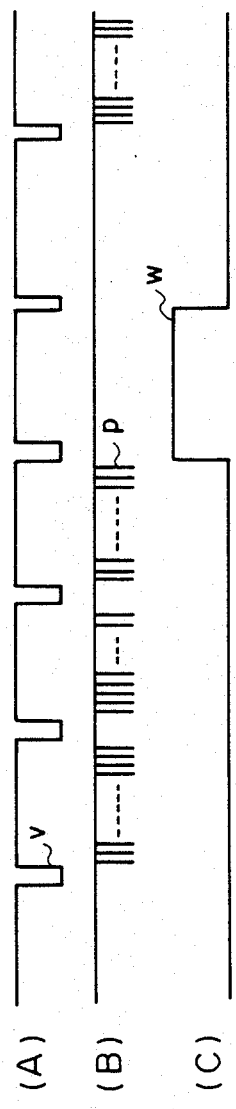
FIG. 11 is a waveform diagram for assistance in describing the operation of the disk player of FIG. 9 with the third embodiment.

The actions resulting from the above operations will be described referring to FIG. 11. FIG. 11A is a waveform diagram of the vertical sync signal v which is produced from the sync separator circuit 86, FIG. 11B is a waveform diagram of the "one-track jump" command pulses p, and FIG. 11C is a waveform diagram of the Write Enable signal w. When a scan command is issued, then a series of 15 "one track jump" command pulses p are issued at successive 1 ms intervals, and supplied to the track jump drive circuit 104. As a result, the data sensing light spot of the pickup is moved radially across the recording disk by precisely 15 tracks, which constitutes one multi-track jump operation. Such multi-track jump operation is performed successively during an interval in which three successive pulses of the vertical sync signal v are produced from the sync separator circuit 86. The multi-track jump operation is performed in alternation with intervals in which play operation performed. Each of these intervals in which play operation is performed extends over two successive vertical scanning intervals, i.e. is a time interval during which two successive pulses of the vertical sync signal v are produced from the sync separator circuit 86. During a time interval extending from the start of play operation until the first pulse of the vertical sync signal v is produced thereafter, the Write Enable signal w is produced (i.e. at the high level). During such an interval in which the Write Enable signal w is produced, one field of video data obtained from the recording disk 62 is written into the RAM 93, to update a stored field of video data which was previously written into RAM 93. The data thus stored in the RAM 93 are then repetitively read out during the succeeding multi-track jump interval, to thereby provide a reproduction video signal.

Figure 12:
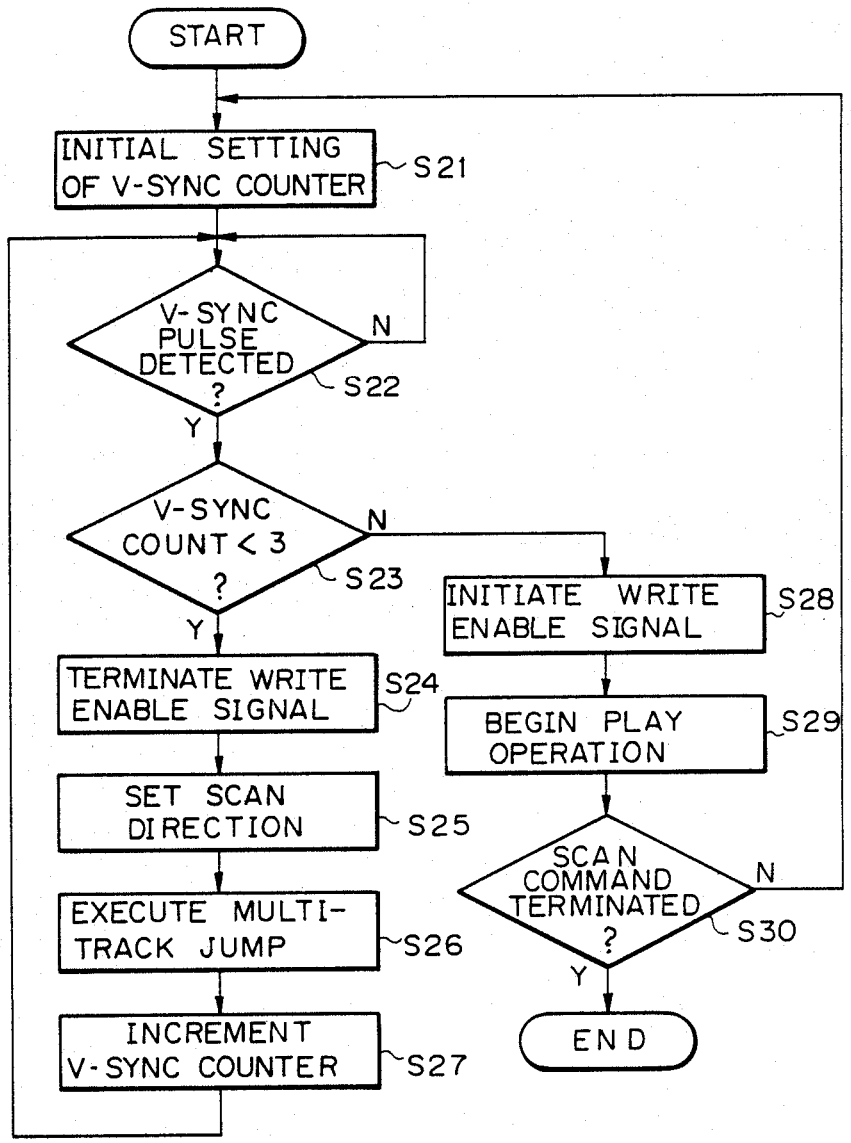
FIG. 12 is a flow chart for illustrating the operation of the fourth embodiment of the present invention.
Figure 14B:
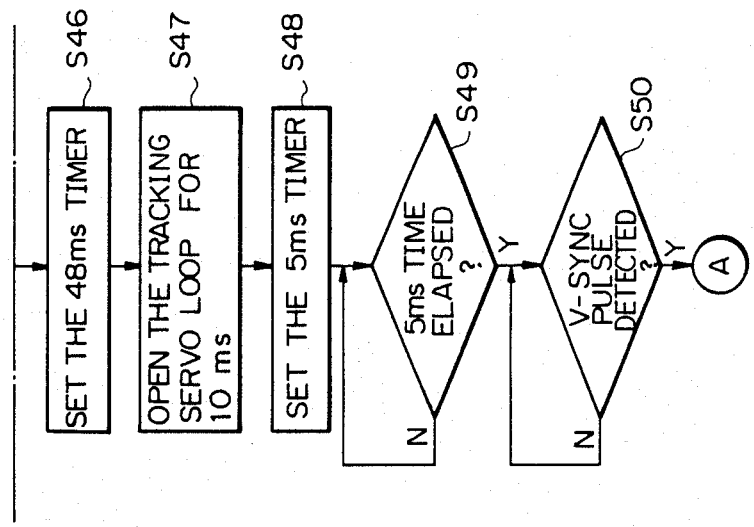
FIG. 14 is a flow chart for describing the operation of the fifth embodiment of a scanning method according to the present invention.

FIG. 12 is a flow chart of the operation of the processor of the system controller 100 for the fourth embodiment of a scanning method according to the present invention. In this embodiment, while play operation is taking place, e.g. by execution of a main routine, if the user issues a scan command by actuating an operating key, the processor operation then moves to step S21. In step S21, initial setting is performed of the contents of an address in the RAM of the system controller 100 which is used as a vertical sync (V sync) counter. The processor operation then moves to step S22, to judge whether or not a pulse of the vertical sync signal v is being output from the sync separator circuit 86. If it is judged in step S22 that a pulse of the vertical sync signal v is not being produced, then the processor repetitively executes step S22 thereafter, and operation moves to step S23 only when it is judged that a vertical sync signal pulse is being produced.

In step S23 a decision is made as to whether or not the count value held in the vertical sync counter is less than 3. If it is judged in step S23 that this count value is less than 3, the processor operation then moves to step S24 in which generation of the Write Enable signal w is halted. The processor operation then moves to step S25, in which the scan direction is set identical to that designated by the scan command, and the processor causes the video signal to be read out from RAM 93 as the reproduction video signal. The processor operation then moves to step S26, in which a sequence of "one-track jump" command pulses p are issued to the track jump drive circuit 104. Each of these pulses p causes the data sensing light spot of the pickup to jump over one recording track, and in this example a sequence of 15 of these pulses occurring once per millisecond is produced to execute a multi-track jump. The processor operation then moves to step S27 in which one is added to the count value held in the vertical sync counter and each of the steps from step S22 thereon is again executed.

If it is judged in step S23 that the count in the vertical sync counter is not less than 3, the processor operation then moves to step S28 whereby the Write Enable signal w is produced. The processor operation then moves to step S29, in which control of various sections of the disk player is executed to begin play operation. The processor operation then moves to step S30, and a decision is made as to whether or not a "scan operation halt" command has been issued. If it is judged in step S30 that such a halt command has been issued, then the processor operation returns to execution of the main routine. If it is judged in step S30 that no "scan operation halt" command has been issued, the processor operation then moves to step S21 and this and subsequent steps are then executed once more.

Figure 13:
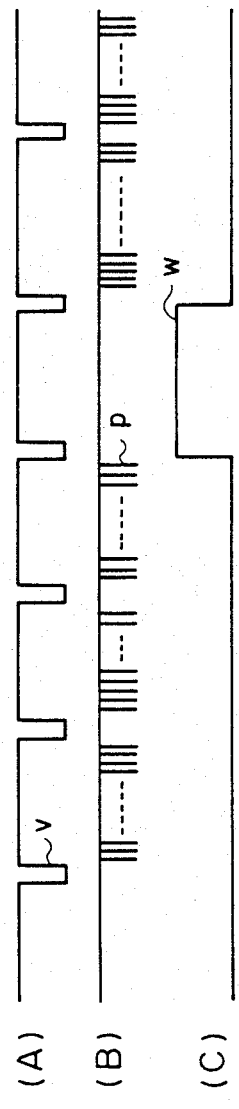
FIG. 13 is a waveform diagram for assistance in describing various signals in the apparatus of FIG. 9 for the fourth embodiment.

The actions resulting from the above operations will be described referring to FIG. 13, in which FIG. 13A is a waveform diagram of the vertical sync signal v which is produced from the sync separator circuit 86, FIG. 13B is a waveform diagram of the "one-track jump" command pulses p, and FIG. 13C is a waveform diagram of the Write Enable signal w. When a scan command is issued, then a series of 15 "one track jump" command pulses p are issued at successive 1 ms intervals, and supplied to the track jump drive circuit 104. As a result, the data sensing light spot of the pickup is moved radially across the recording disk by precisely 15 tracks, which constitutes one multi-track jump operation. Three such multi-track jump operations are performed successively during an interval in which three successive pulses of the vertical sync signal v are produced from the sync separator circuit 86. Successive ones of these jump operations are performed in alternation with intervals in which the play operation is performed. Each of these intervals in which the play operation is performed extends over two successive vertical scanning intervals, i.e. is a time interval during which two successive pulses of the vertical sync signal p are produced from the sync separator circuit 86.

During this time, while the Write Enable signal w is being produced, one field of video data obtained from the recording disk 62 is written into the RAM 93, to update a stored field of video data which was previously written into RAM 93. The data thus stored int the RAM 93 are then repetitively read out during the succeeding multi-track jump interval, to thereby provide a reproduction video signal.

With a scanning method according to the present invention as described in the above, at least one field of video data obtained from a recording disk during play operation is written into a video memory to update the memory contents, at the same time that this video data is being output from the player as a video signal. While multi-track jump operations are being repetitively performed, with each such multi-track jump operation resulting in the sensing light spot' of the pickup being moved across a predetermined number of tracks of the recording disk and with each such multi-track jump occurring during a predetermined time interval, the data stored in the memory are repetitively read out therefrom to be utilized as reproduction data. In this way, since the slider servo system is not set in the OFF state, the reproduction speed during high-speed reproduction operation is determined only by the ratio of the duration of each multi-track jump interval to that of each interval in which play operation is executed. Thus, adjustment of the speed of high-speed reproduction can be easily performed.

The operational flow of the system controller 100 for a fifth embodiment of a scanning method according to the present invention will be described referring to the flow chart of FIG. 15. Firstly, if a play operation command is issued by actuation of a "play" key, during execution of a routine such as a main routine, then the processor operation moves to step S41, in which control of various sections of the disk player is executed such that playback of video and audio data recorded on the recording disk 62 is performend, and the reproduced video and audio data are supplied direct to video terminal 102 and to audio terminals 76 and 77 respectively, without passing the circuit including the RAM 93. When this takes place, the processor initiates a Write Enable signal w, whereby video data obtained from the recording disk 62 are written into the RAM 93, and the processor operation then moves to step S42 in which a decision is made as to whether or not a scan command has been issued. If it is judged in step S42 that a scan command has not been issued, the processor operation returns to step S41. If it is judged in step S42 that a scan command has been issued, the processor operation then moves to step S43, in which a decision is made as to whether or not a pulse of the vertical sync signal v is being produced from the sync separator circuit 86. If it is judged in step S43 that a vertical sync signal pulse v is not being produced, then execution of step S43 is repetitively performed until it is judged that a pulse of the vertical sync signal v has been produced from the sync separator circuit 86. If it is judged that a vertical sync signal pulse v is produced, the processor operation then moves to step S44, whereupon the processor terminates the Write Enable signal w to thereby prevent further write-in of the video data to the RAM 93. The processor then executes control of the changeover swich 90 such that the video signal obtained by reading data from the RAM 93 is selected to be supplied to the output terminal 102.

The processor operation then moves to step S45, in which issuance of a "forcible transport" command signal b to the slider servo circuit 66 is initiated, and the processor operation then moves to step S46 in which initial setting is performed of a programmable timer contained in the system controller 100, to set a time of 48 ms, and timer operation is then started. The processor operation then moves to step S47, in which the tracking servo loop is set in the open state and held open for 10 ms. The processor operation then moves to step S48 in which a second programmable timer (different from the programmable timer of step S46) is set to a time of 5 ms, and timer operation thereof is started. The processor operation then moves to step S49, in which a decision is made as to whether or not the time set for the 5 ms timer has elapsed. If this time is judged to have elapsed, the processor operation then moves to step S50.

In step S50, the processor judges whether or not a pulse of the vertical sync signal v is being produced from the sync separator circuit 86, and if no pulse is being output, step S50 is repetitively executed until output of a pulse of the vertical sync signal v occurs. The processor operation then moves to step S51.

In step 51 the processor produces a Write Enable signal until the next pulse of vertical sync signal v is produced, and during that time one field of the video signal obtained from the recording disk is written into RAM 93. The processor operation then moves to step S52, in which a decision is made as to whether or not the scan command continues to be issued. If it is judged in step S52 that the scan command is still in force, then the processor operation moves to step S53, and a decision is made as to whether or not the time set for the 48 ms timer has elapsed. If it is judged that this time has elapsed, the processor operation then moves to step S46.

If it is judged in step S52 that the scan command is no longer being issued, then the processor operation moves to step S54, in which issuance of the "forcible transport" command signal b to the slider servo circuit 66 is terminated. The processor operation then moves to step S55, in which a decision is made as to whether or not a pulse of the vertical sync signal v is being produced from the sync separator circuit 86. If it is judged in step S55 that a pulse of the vertical sync signal v is not being produced, then the processor repetitively executes step S55 until it is judged that a vertical sync signal pulse is being output. The processor operation then moves to step S56, in which the processor controls the disk player such as to reproduce the video and audio signals recorded on the recording disk 62 and to supply these to the video output terminal 102 and audio output terminals 76 and 77 respectively. The processor operation then returns to the routine which was being executed prior to step S41.

The actions resulting from the above operations will be described referring to FIG. 15, in which FIG. 15A is a waveform diagram of the "tracking loop open" command signal a, FIG. 15B is a waveform diagram of the "forcible transport" command signal b which is issued to the slider servo circuit 66, FIG. 15C is a waveform diagram of the changeover control signal d which is supplied to the changeover switch 90, FIG. 15D is a waveform diagram of the vertical sync signal v which is produced from the sync separator circuit 86, and FIG. 15E is a waveform diagram of the Write Enable signal w. When a scan command is issued, generation of the Write Enable signal w is halted in synchronism with the vertical sync signal v, and write-in of data to the RAM 93 is halted. At the same time, the control signal d goes to the high level, whereby the changeover switch 90 is controlled such as to select video data read out from RAM 93 to become the output reproduction video signal from output terminal 102. In addition, generation of the "forcible transport" command b is initiated, whereby the slider 69 is forcibly driven. This "forcible transport" command signal b continues to be produced until the scan command is terminated.

So long as the scan command continues to be generated, i.e. so long as the slider 69 is forcibly driven, the "tracking open" command signal a is produced during successive 10 ms intervals with a repetition period of 48 ms.

As a result of this forcible movement of the slider 69, the amount of deflection of the tracking actuator in the pickup 63 becomes large, and when the tracking servo loop is opened in response to the "tracking open" command signal a, the tracking actuator returns to the center of its range of movement, so that the deflection of the data sensing light spot becomes zero. A track jump is thus executed across the recording disk 62 by the data sensing light spot. Each time a "tracking open" command is terminated (i.e. each time signal a returns from the high to the low level), the tracking servo loop is closed, and after a time of 5 ms has elapsed (i.e. the time required for the tracking servo loop to achieve lock-in), the system waits to detect the next pulse of the vertical sync signal v, in step S50. When a pulse of the vertical sync signal v is detected in step S50, the Write Enable signal is generated (i.e. signal w goes to the high level) from the end of that vertical sync pulse until the start of the next vertical sync pulse, whereby one field of the video signal is written into RAM 93 to replace the previous memory contents.

In this way, after each track jump operation of the data sensing light spot, the contents of RAM 93 are rewritten by one field of the video signal which is obtained from the disk. So long as a scan command continues to be issued, so that track jumps are executed periodically at 48 ms intervals, a video signal produced by repetitively reading out the current contents of the RAM 93 is selected to be suppplied to the output video terminal 102. In this way, an output reproduction signal is produced during scan operation which provides a picture that is free from disorder and has high resolution.

With the third, fourth and fifth embodiments of the present invention described above, track jump operations are periodically initiated with a predetermined period, while data stored in a video memory are repetitively read out to be produced as reproduction data. During play operation following each track jump operation, after a predetermined time interval has elapsed following the end of that track jump operation, at least one field of video data obtained from the recording disk is written into the video memory to replace the previous memory contents, and the video memory contents are read out to be produced as output reproduction video data. As a result, updating of the stored contents of the video memory is periodically executed with a substantially constant period during scan operation, while data which are read out from the memory are produced as output reproduction data both during play operation and during track jumping operation, for the duration of a scan command. Furthermore during normal reproduction operation (i.e. other than during scan operation), the output signal from CCD 84 is transferred directly to the video signal output terminal of the disk player, without being transferred through the video memory constituted by RAM 93. As a result, these embodiments enable high-speed scanning to be executed with a display image being produced which is free from noise and disorder, while in addition a high-resolution display image is produced during normal reproduction operation, in which the video memory is not utilized.

What is claimed is:

1. In a disc player for reproducing a video signal recorded on an information recording disc comprising a turntable for carrying and rotating said information recording disc to be played back, a pickup unit for irradiating an incident light beam onto said disc carried on said turntable for receiving a reflected light beam reflected from said disc so as to convert the reflected light beam into an information signal, said pickup unit including a tracking actuator for deflecting said light beam in a radial direction of said disc, pickup unit carriage means for positioning said pickup unit along the radial direction of said disc as said disc is rotated, tracking error signal generating means for generating a tracking signal having a magnitude representing a deviation of a pickup spot produced on said disc by said incident light beam from a target track, tracking servo means for driving said tracking actuator and said pickup unit carriage means so as to reduce the magnitude of said tracking signal, demodulating means for demodulating said information signal into a video signal including vertical synchronization pulses, and time-base servo means for performing a time-base control of said video signal while comparing the synchronization signal separated from said video signal by said demodulating means with a reference signal, the improvement comprising:
    means for selectively issuing a scan command signal;
    carriage drive means for causing said pickup unit carriage means to move said pickup unit at a predetermined speed as long as a scan command signal exists;
    tracking inhibition signal generating means for intermittently producing a tracking inhibition signal as long as said scan command exists, said tracking inhibition signal being at one of a high level or a low level;
    tracking servo switch means for inhibiting said tracking servo means from driving said tracking actuator in response to said tracking inhibition signal;
    memory means for storing a portion of said video signal occurring after one of said vertical synchronization pulses occurs upon the lapse of a first predetermined time period from a transition of said tracking inhibition signal from said high level to said low level; and
    read-out means for producing a read-out signal for repeatedly reading out the stored portion of the video signal from said memory means.

2. The disc player of claim 1, wherein said tracking inhibition signal generating means includes an oscillator for producing pulses at a constant frequency, each of said pulses being said tracking inhibition signal.

3. The disc player of claim 1, wherein said memory means includes an analog-to-digital converter for converting said video signal into a digital signal, a timing signal generator for producing a timing signal lasting for a predetermined duration after a second predetermined time period has lapsed from said transition of said tracking inhibition signal from said high level to said low level, a write-in controller for producing a write-in control signal in synchronism with one of said vertical synchronization pulses in response to said timing signal, a digital memory for storing said digital signal in response to said write-in control signal and issuing said stored digital signal in response to said read-out signal.

4. The disc player of claim 3, and further comprising time-base servo switch means for inhibiting said time-base servo means from performing said time-base control as long as said tracking inhibition signal exists.

5. The disc player of claim 4, wherein said time-base servo switch means allows said time-base servo means to perform the time-base control upon the lapse of a third predetermined time period from the transition of said tracking inhibition signal from said high level to said low level, said third predetermined time period being longer than said first predetermined time period but shorter than said second predetermined time period.

6. The disc player of claim 1, and further comprising:
    selecting means for selecting said video signal either from said demodulating means or from the stored and readout portion of the video signal of said memory means.

* * * * *